United States Patent
Yeap et al.

(10) Patent No.: US 7,861,081 B2
(45) Date of Patent: Dec. 28, 2010

(54) SECURITY SYSTEM AND METHOD

(75) Inventors: Tet Hin Yeap, Ottawa (CA); William G. O'Brien, Ottawa (CA); Dafu Lou, Ottawa (CA); Ren Xiaoli, Ottawa (CA)

(73) Assignee: BCE Inc., Verdun, Quebec (CA)

( * ) Notice: Subject to any disclaimer, the term of this patent is extended or adjusted under 35 U.S.C. 154(b) by 1126 days.

(21) Appl. No.: 10/860,247

(22) Filed: Jun. 4, 2004

(65) Prior Publication Data
US 2005/0216747 A1 Sep. 29, 2005

Related U.S. Application Data

(63) Continuation-in-part of application No. PCT/CA2004/000455, filed on Mar. 26, 2004.

(51) Int. Cl.
G06F 21/00 (2006.01)
H04L 29/06 (2006.01)
(52) U.S. Cl. .............................. 713/167; 713/185; 726/4
(58) Field of Classification Search ................. 713/185, 713/182; 726/2, 9
See application file for complete search history.

(56) References Cited

U.S. PATENT DOCUMENTS

| | | | |
|---|---|---|---|
| 5,742,756 A | 4/1998 | Dillaway et al. | |
| 5,960,085 A * | 9/1999 | de la Huerga | 340/5.61 |
| 6,092,202 A | 7/2000 | Veil et al. | |
| 6,189,105 B1 | 2/2001 | Lopes | |
| 6,497,656 B1 | 12/2002 | Evans et al. | |
| 6,810,480 B1 | 10/2004 | Parker et al. | |
| 6,819,219 B1 | 11/2004 | Bolle et al. | |
| 7,080,404 B2 * | 7/2006 | Abdo et al. | 726/3 |

(Continued)

FOREIGN PATENT DOCUMENTS

EP 1 239 630 A2 9/2002

(Continued)

OTHER PUBLICATIONS

Greg Shultz, Windows XP Remote Desktop, Part 2: Configuring and Using the Client System; Nov. 28, 2001; http://www.win.net/optimator/WinWiz/Tips/WXPRDP2.htm; Retrieved date Feb. 20, 2010; pp. 1-10.*

(Continued)

*Primary Examiner* — Gilberto Barron, Jr.
*Assistant Examiner* — Samson B Lemma

(57) ABSTRACT

A security system and method is provided. In an embodiment, a personal integrated circuit ("PIC"), is provided that can be presented to a laptop computer. The PIC includes a digital certificate personal to an authorized user and is operable to automatically install the certificate on the laptop computer once presented into the computer and once the user enters a valid password respective to the PIC. At this point, the laptop presents the certificate to a server via a network, and the certificate is checked for validity. If valid, the user is then permitted to log into the server. Having logged into the server, the user can remain logged in even as the PIC is removed and presented to different computing devices that are also able to connect to the server via the network. Typically, the user is only able to access the server through the computing device to which the PIC is attached. The user is automatically logged out of the server after a predefined period of inactivity or according to such other criteria as may be desired.

34 Claims, 27 Drawing Sheets

U.S. PATENT DOCUMENTS

| | | | |
|---|---|---|---|
| 7,228,429 | B2 | 6/2007 | Monroe |
| 7,444,415 | B1 * | 10/2008 | Bazzinotti et al. ........... 709/229 |
| 2002/0004762 | A1 | 1/2002 | Izumoto |
| 2002/0065625 | A1 | 5/2002 | Xydis |
| 2002/0065905 | A1 | 5/2002 | Kvistad et al. |
| 2002/0094087 | A1 | 7/2002 | Dellmo et al. |
| 2002/0111946 | A1 | 8/2002 | Fallon |
| 2002/0123325 | A1 | 9/2002 | Cooper |
| 2002/0129285 | A1 | 9/2002 | Kuwata et al. |
| 2002/0147920 | A1 | 10/2002 | Mauro |
| 2002/0180586 | A1 | 12/2002 | Kitson et al. |
| 2003/0005300 | A1 | 1/2003 | Noble et al. |
| 2003/0034877 | A1 | 2/2003 | Miller et al. |
| 2003/0093663 | A1 | 5/2003 | Walker |
| 2003/0093690 | A1 * | 5/2003 | Kemper ..................... 713/201 |
| 2003/0149874 | A1 | 8/2003 | Balfanz et al. |
| 2003/0191799 | A1 * | 10/2003 | Araujo et al. .............. 709/203 |
| 2003/0226017 | A1 * | 12/2003 | Palekar et al. .............. 713/168 |
| 2004/0002305 | A1 | 1/2004 | Byman-Kivivuori et al. |
| 2004/0064720 | A1 | 4/2004 | Hessel et al. |
| 2004/0068668 | A1 * | 4/2004 | Lor et al. ................... 713/201 |
| 2004/0073792 | A1 | 4/2004 | Noble et al. |
| 2004/0153670 | A1 | 8/2004 | Casey et al. |
| 2004/0172558 | A1 | 9/2004 | Callahan et al. |

FOREIGN PATENT DOCUMENTS

| | | |
|---|---|---|
| EP | 1318459 | 6/2003 |
| EP | 1 351 467 A2 | 10/2003 |
| WO | WO 00/42491 A1 | 7/2000 |
| WO | WO 00/72506 A1 | 11/2000 |
| WO | WO 02056154 A2 * | 7/2002 |

OTHER PUBLICATIONS

PCT/CA2004/000455 (ISR), Aug. 2, 2004, BCE Inc.

PCT/CA2005/001716 (ISR), Feb. 21, 2006, BCE Inc.

Office Action mailed on Jul. 8, 2008 in connection with U.S. Appl. No. 11/002,077.

Office Action mailed on Nov. 25, 2008 in connection with U.S. Appl. No. 11/002,077.

Office Action mailed on Aug. 17, 2009 in connection with Canadian Patent Application 2,552,987.

Office Action mailed on Jul. 22, 2009 in connection with U.S. Appl. No. 11/002,077.

Office Action issued by the Canadian Intellectual Property Office on Mar. 4, 2010 in connection with CA Patent Application No. 2,571,848, 5 pages.

\* cited by examiner

SECURITY SYSTEM AND METHOD

PRIORITY CLAIM

The present application is a continuation-in-part of PCT Patent Application Number PCT/CA2004/000455, filed on Mar. 26, 2004, the contents of which are incorporated herein by reference.

FIELD OF THE INVENTION

The present invention relates generally to computer security and more particularly to security system and method.

BACKGROUND OF THE INVENTION

Security continues to present challenges as hackers and other malicious party's attempt to gain unauthorized access to sensitive computers and associated networks. The prior art is full of examples that attempt to reduce such unauthorized access. One of the most rudimentary forms of security is the requirement for users to present a unique login and password combination. Once the user is logged in, other security techniques can be employed such as the use of encryption of the user's communications to prevent eavesdroppers from gaining access to those communications.

Many problems of course persist with prior art security techniques. For example, it is accepted that the greater the security protocols, the greater difficulty it can be for the user to actually make use of the computer. For example, it can be required to have the user reenter the login and password after a period of inactivity. If that period of inactivity is excessively short, the user will spend more time authenticating him or herself rather than actually performing the computing task. By the same token, where the user is switches the computing device through which the user wishes to access the computer network, it can be tedious to require the user to reenter the login and password each time the user switches to another device. Still further problems arise when the switch of user devices also involves the user switching the type of network being utilized.

While the foregoing problems, and variations thereof, arise in a number of applications, it is helpful to describe a specific example. In mobile networks employed by certain police forces, police cruisers are typically equipped with a laptop computer that is able to wirelessly access a server that is operated by a police force respective to that cruiser. The police force server can hold a variety of sensitive police records that will help the police officer with his or her duties. Such police records can include, for example, criminal records. Thus, the laptop computer is used to allow the officer to access criminal records, but it is also very important that access to those criminal records be restricted to the police officer. Clearly, a high level of security is needed, yet the security protocols cannot be so onerous that the officer is unable to make effective use of this law enforcement tool. The foregoing security needs are further complicated by the increasing use of wireless personal digital assistants ("WPDA") by the police officer. In this situation, a police officer may wish to take the WPDA from the cruiser and yet still be able to access the police force server and the criminal records thereon. Further complications arise where the police officer desires to move from using the laptop to the WPDA several times in a shift.

SUMMARY OF THE INVENTION

It is an object of the present invention to provide a novel security system and method that obviates or mitigates at least one of the above-identified disadvantages of the prior art.

An aspect of the invention provides a system for providing secure access to a computing resource comprising a computing device accessible to a user after a local authentication of the user. The system also comprises an authentication server connectable to the computing device via a connection after the local authentication and operable to provide access to the computing resource after a remote authentication of the user. The server is further operable to maintain the remote authentication after the user has terminated the local authentication such that after the user re-establishes local authentication the server continues to provide access to the resource without the need for further remote authentication.

The user can re-establish the local authentication via a second connection that is different from the connection. The user can re-establish the local authentication using a second computing device that is different from the computing device.

The user can re-establish the local authentication using a second computing device that is different from the computing device and via a second connection that is carried through the computing device.

The server and the device can be further operable to encrypt communications over the connection while access is provided to the resource.

The encrypted communications can be conducted via an asymmetric key pair that is generated by the server and which remain valid for the duration that the server maintains the remote authentication.

The resource can be a virtual private network that connects to the server.

The server can terminate the remote authentication if the user fails to re-establish local authentication within a predefined period of time.

The remote authentication can include receipt and validation of a digital certificate respective to the user that is loadable onto the computing device.

The remote authentication can include receipt of a userid and password respective to the user that is received by the computing device and transmitted to the server.

Another aspect of the invention provides an authentication server for connection with a computing device that is accessible to a user after a local authentication of the user. The authentication server is connectable to the computing device via a connection after the local authentication and operable to provide access to the computing resource after a remote authentication of the user. The server is further operable to maintain the remote authentication after the user has terminated the local authentication such that after the user re-establishes local authentication the server continues to provide access to the resource without the need for additional remote authentication.

Another aspect of the invention provides a method of providing secure access to a computing resource comprising the steps of:

performing a local authentication of a user at a computing device;

performing a remote authentication at an authentication server connectable to the computing device via a connection after the local authentication;

providing access to the computing resource via the authentication server after the remote authentication; and, maintaining the remote authentication after the user has terminated the local authentication.

The method can comprise the additional step of re-establishing the access when the user re-establishes the local authentication.

The method can comprise the additional step of terminating the remote authentication if the user fails to re-establish the local authentication within a predefined period of time.

Another aspect of the invention provides a method of providing secure access to a computing resource comprising:

sending a digital certificate from a computing device to a server;

receiving a remote user authentication at the server from the computing device and determining if the remote user authentication is valid;

terminating the method if the user authentication is not valid;

generating security keys at the server and delivering a requisite portion of those keys to the computing device;

conducting communications between the server and the computing device using the security keys; and, maintaining the remote user authentication when the computing device disconnects from the server.

BRIEF DESCRIPTION OF THE DRAWINGS

The invention will now be described by way of example only, and with reference to the accompanying drawings, in which.

DETAILED DESCRIPTION OF THE INVENTION

Figure 1:
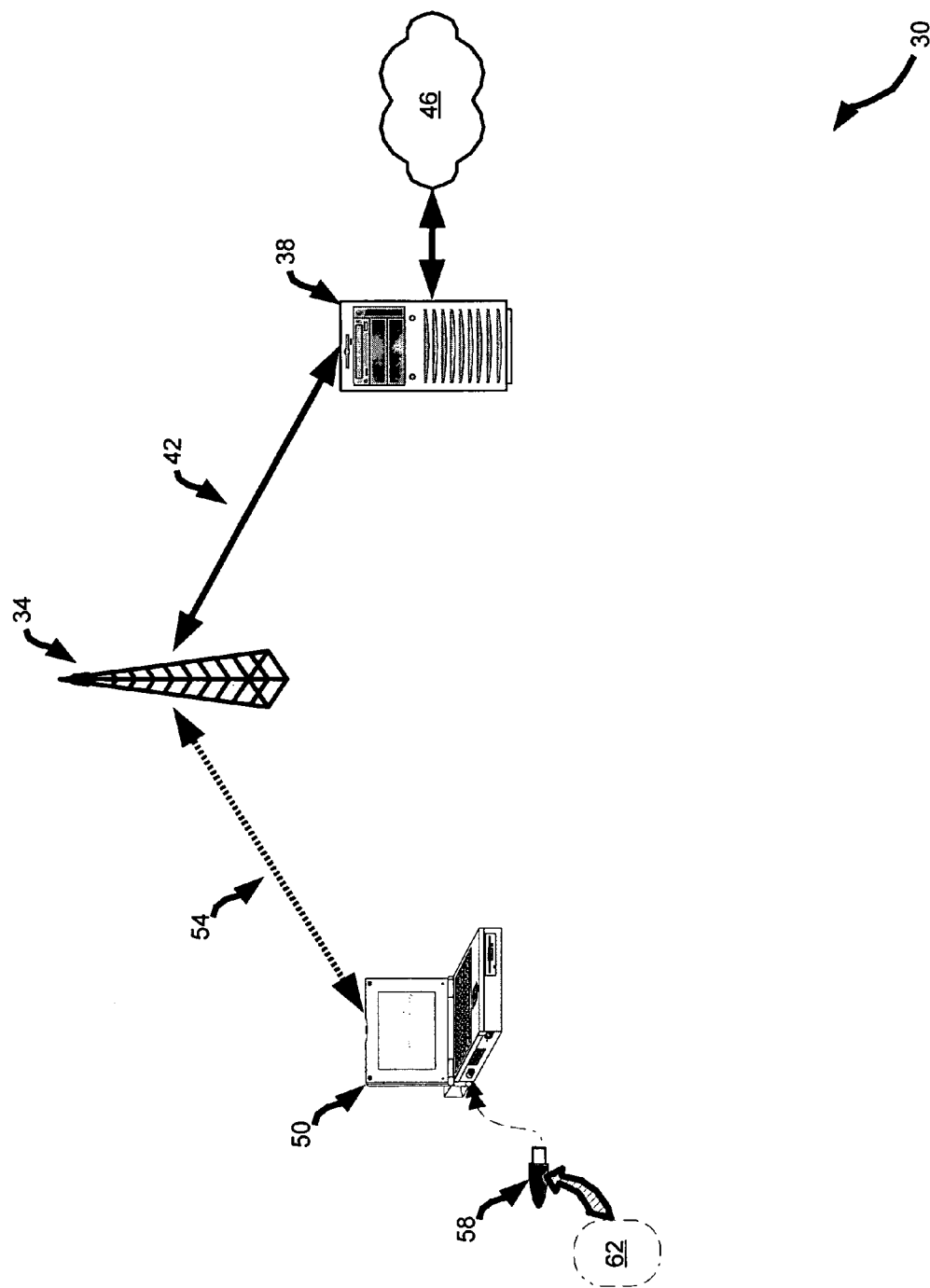
FIG. 1 is a schematic representation of a security system.

Referring now to FIG. 1, a security system is indicated generally at 30. System 30 includes a wireless base station 34 that is connected to a server 38 via a backhaul 42, which can be implemented using any type of suitable land line link such as T3, T1, OC3 etc. In turn, server 38 connects to the Internet 46 (and/or an Intranet and/or another other type of network that may be desired). Base station 34 also connects to a laptop computer 50 via a wireless link 54.

In a present embodiment, system 30 is utilized by a police force, and thus laptop 50 is mounted inside a police cruiser and is a mobile device, while server 38 is located at a police headquarters (or other suitable location) and remains fixed. Link 54 is based on any suitable data wide area network, and in a present embodiment is based on the 1XRTT network as is presently employed by Bell Mobility, a division of Bell Canada Enterprises, in various locations throughout Ontario and Quebec, Canada. When properly authenticated, a police officer using laptop 50 can access police records at server 38 and/or can also access Internet 46 in the usual manner. The details of such authentication and access will be more particularly described below.

System 30 also includes a personal integrated circuit ("PIC") 58 that can be presented to a port on computer 50. In a present embodiment PIC 58 has a form factor consistent with a USB Pen Drive or USB Memory Stick and includes a Universal Serial Bus ("USB") connector and thus can connect to a USB port on computer 50. In other embodiments, however, PIC 58 can be based other types of wired or wireless interfaces, such as RS-232, Infrared, Bluetooth etc and/or can be based on a variety of different technologies and form factors such as radio-frequency identification tags, memory sticks, other types of integrated circuit media, etc.

Figure 2:
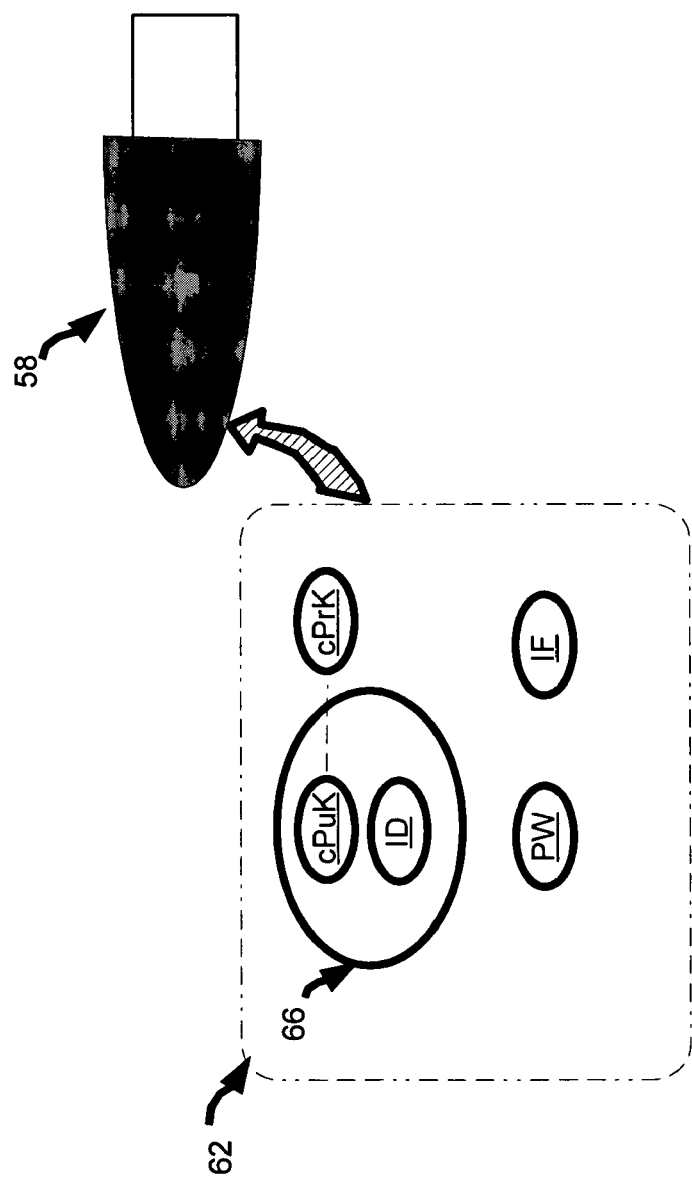
FIG. 2 shows the personal integrated circuit of FIG. 1 in greater detail.

PIC 58 contains a set of data files, represented at reference 62 in system 30. For an entire police force, a unique PIC 58 is assigned to each police officer, and thus each PIC 58 contains data files 62 that are unique and respective to the assigned police office. Referring now to FIG. 2, data files 62 are shown in greater detail. Data files 62 include a digital certificate 66 which has been generated uniquely for the police officer that owns PIC 58. Digital certificate 66 can be generated in any desired manner but is typically generated by a recognized Certificate Authority (CA). Digital certificate 66 will thus contain a public encryption key cPuK that is uniquely associated with that police officer and a variety of other identification information ID for that police officer. Files 62 also contain a private encryption key cPrK that corresponds to the public encryption key cPuK. Files 62 also contains a password PW that is known by the police officer that owns PIC 58. Such a password PW can be used for local authentication on laptop computer 50. Additionally, file 62 contain an install file IF that is executable on laptop 50 in order to oversee the installation of certificate 66, and other components of files 62, on laptop 50. However, while in the present embodiment file 62 contains install file IF, it is to be understood that in other embodiments the install file IF can be downloaded from a network and run once for the first installation of digital certificate 66.

Figure 3:
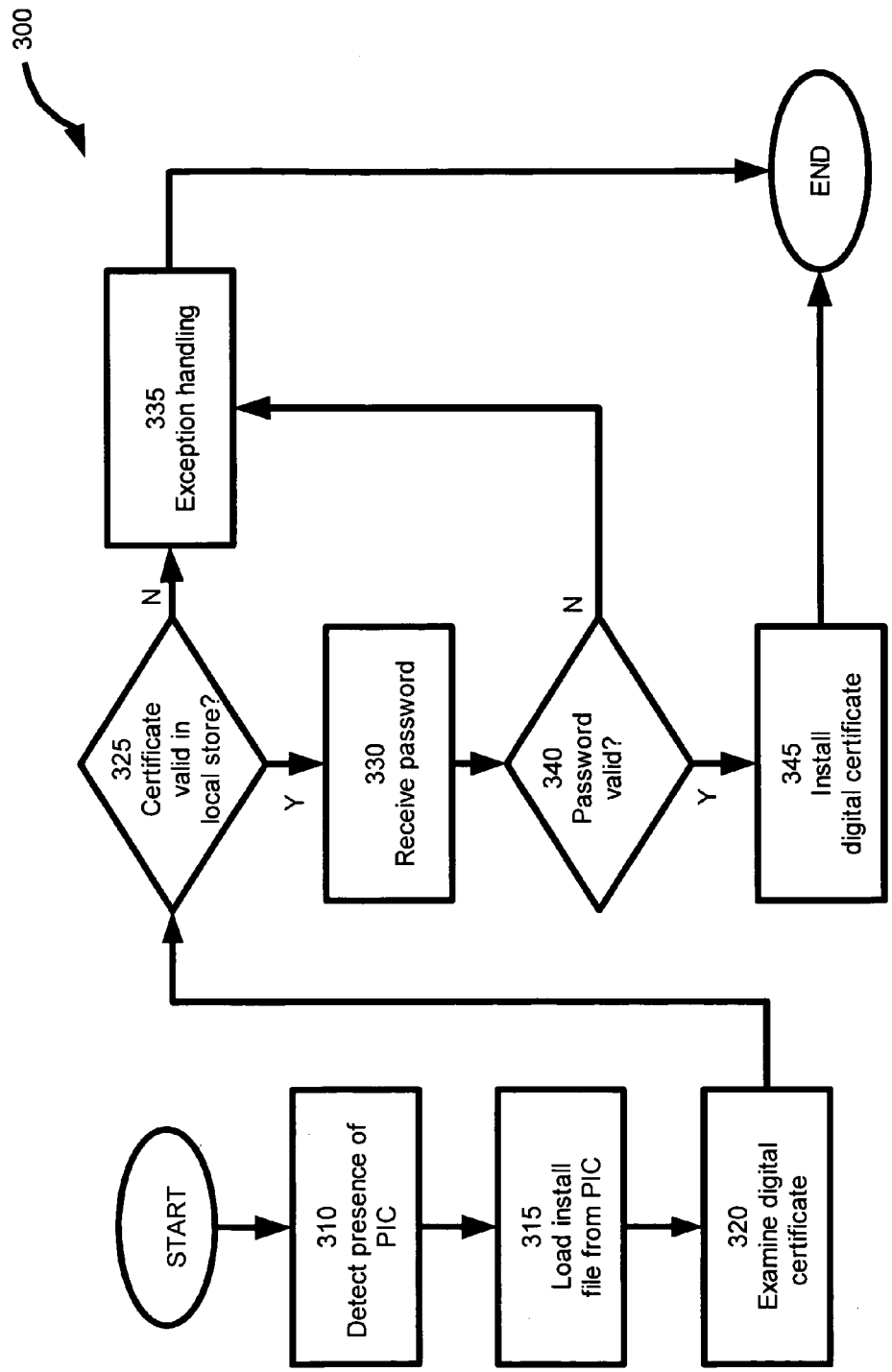
FIG. 3 shows a flowchart depicting a method of installing a certificate.

In order to help explain certain of these implementations and various other aspects of system 30, reference will now be made to FIG. 3 which shows a method for installing a digital certificate and which is indicated generally at 300. In order to assist in the explanation of the method, it will be assumed that method 300 is operated by laptop 50 in conjunction with PIC 58. However, it is to be understood that system 30 and/or method 300 can be varied, and need not work exactly as discussed herein in conjunction with each other, and that such variations are within the scope of the present invention.

Before discussing method 300, certain assumptions will be made about system 30. First, it is assumed that PIC 58 has not been inserted into laptop 50. Second, in a present embodiment it is assumed that laptop 50 is based on the Windows 2000 operating system (and/or Windows XP and/or its variants) from Microsoft Corporation of is One Microsoft Way, Redmond, Washington 98052-6399, and includes the digital certificate manager that comes with Windows 2000. It is to be understood that this is merely an example, however, and that in other embodiments laptop 50 can be based on other computing environments.

Beginning first at step 310, the presence of the PIC is detected. In the present example, laptop 50 will thus await for PIC 58 to be inserted into an available one of its USB ports, and will thus detect the presence of PIC 58 using the standard plug-and-play functionality inherent to Windows 2000. At step 315, the install file is loaded from PIC. Thus, still using the plug-and-play features of Windows 2000, the install file IF stored on PIC 58 will be loaded from PIC 58 onto laptop 50 and executed thereon. Thus, in this example, the remaining steps 320-335 are principally performed by install file IF.

At step 320, the digital certificate is examined. Install file IF, now executing on laptop 50, will examine the contents of certificate 66 and compare it with a local store of revoked certificates that are kept in a cache locally on laptop 50. At step 325, it is determined whether the certificate is valid. If certificate 66 is found to have been revoked according to the information in the cache, then it will be determined at step 325 that "no", the certificate is not valid at method 300 will advance to step 335 for exception handling. The type of exception handling at step 335 is not particularly limited and can be configured according to the desired security parameters of system 30. For example, it can be desired at this point to send a signal to server 38 indicating that someone has tried to use a PIC 58 that contains a revoked certificate. In any event, no access will be given to laptop 50 at step 335. (While the present embodiment contemplates that laptop 50 retains a local store of revoked certificates in a cache, it is to be understood that in other embodiments laptop 50, or another computing device, may not maintain such a cache, and thus verification of the status of certificate 66 would be performed at server 38 only.)

However, if at step 325 the certificate 66 appears valid in light of a comparison with the local store, then method 300 will advance to step 330 and a password will be received. More specifically, a dialog box will be opened on the screen of laptop 50 requesting that the user of laptop 50 enter a password. Once the password is received, method 300 advances to step 340. At step 340, if the password that is entered at step 330 does not match with password PW, then method 300 will advance to step 335 for exception handling.

Again, the type of exception handling at step 335 is not particularly limited and can be configured according to the desired security parameters of system 30. For example, it can be desired at this point to allow the user to re-enter the password a predefined number of times, and if a correct password is entered then return the method 300 back to step 340. However, if the correct password is not entered after the predefined number times, the access to laptop 50 can be completely blocked. Additionally, if a wrong password is entered a certain number of times, then laptop 50 can send a signal to server 38 indicating that someone has tried to use a PIC 58 without the proper password and thereby instruct that certificate 66 be revoked.

However, if at step 340 a correct password is received then method 300 will advance to step 345 and the digital certificate will be installed. Using laptop 50, at this point install file IF can use any known script to actually transfer certificate 66 into the certificate repository that is included with Windows 2000, and also to transfer the certificate private key cPrK to the certificate repository so that the key pair cPrK and cPuK are available for encryption of traffic.

Figure 4:
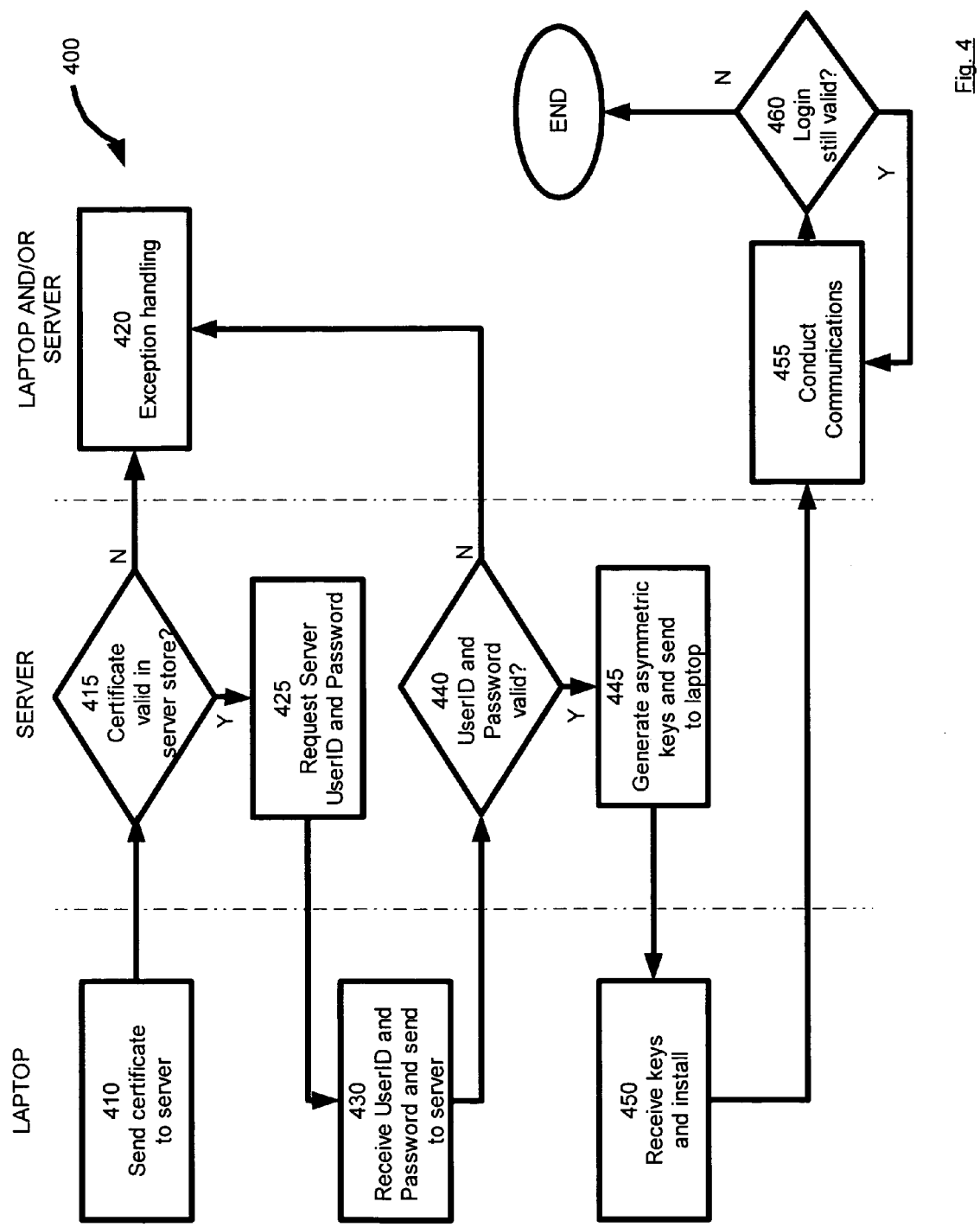
FIG. 4 shows flowchart depicting a method of logging into a server.

Having performed method 300, additional steps can now be taken to provide an officer using laptop 50 access to server 38 and/or Internet 46. Reference will now be made to FIG. 4 which shows a method for authenticating a user and which is indicated generally at 400. In order to assist in the explanation of the method, it will be assumed that method 400 is operated using system 30 once method 300 has been performed. However, it is to be understood that system 30 and/or method 300 and/or method 400 can be varied, and need not work exactly as discussed herein in conjunction with each other, and that such variations are within the scope of the present invention.

Beginning at step 410, the certificate is sent to the server. Step 410 is performed by laptop 50, which takes certificate 66 and sends it to server 38 over links 54 and 42 via base station 34. At step 415, it is determined whether the certificate is valid. Step 415 is performed by server 38, which compares certificate 66 with a local cache of valid and/or revoked certificates, as desired, in order to verify that certificate 66 is still valid.

If certificate 66 is not valid, then method 400 advances from step 415 to step 420 for exception handling. Again, the way the exception handling is effected is not particularly limited. It is particularly contemplated that server 38 would send a message to laptop 50 informing laptop 50 that certificate 66 has been revoked and thereby cause laptop 50 to cease providing access to laptop 50. It is also contemplated that a notification from server 38 could be sent to other entities in the police force informing that access to a laptop with an invalid certificate has been attempted so that the invalid certificate can be investigated.

However, if at step 415 it is determined that certificate 66 is valid, then method 400 advances to step 425 and at this point server 38 requests the provision of a UserID and password from laptop 50. This provision of a UserID and password can be considered a remote authentication. (As used herein, the term UserID and login may be used interchangeably, according to the context in which they are used.) (Note that, in the present embodiment a UserID and password are requested, but other types of user authentication can be used. For example, it can be desired to simply ask for a UserID, without a password.) Accordingly, at step 430, a dialog box on laptop 50 will be presented asking the office using laptop 50 to provide a UserID and password. The received UserID and password are then sent back to server 38.

At step 440, it is determined by server 38 whether the UserID and password are valid. This determination is made by server 38 which compares the UserID and password with a known UserID and password that is unique to the earlier received digital certificate 66. If the received UserID and password do not match with the known UserID and password, then method advances from step 440 to step 420 for exception handling. The exception handling at this point could allow the officer to reenter the UserID and password a predefined number of times, and only at this point deny access to server 38, and/or instruct laptop 50 to prevent further access to laptop 50.

Figure 5:
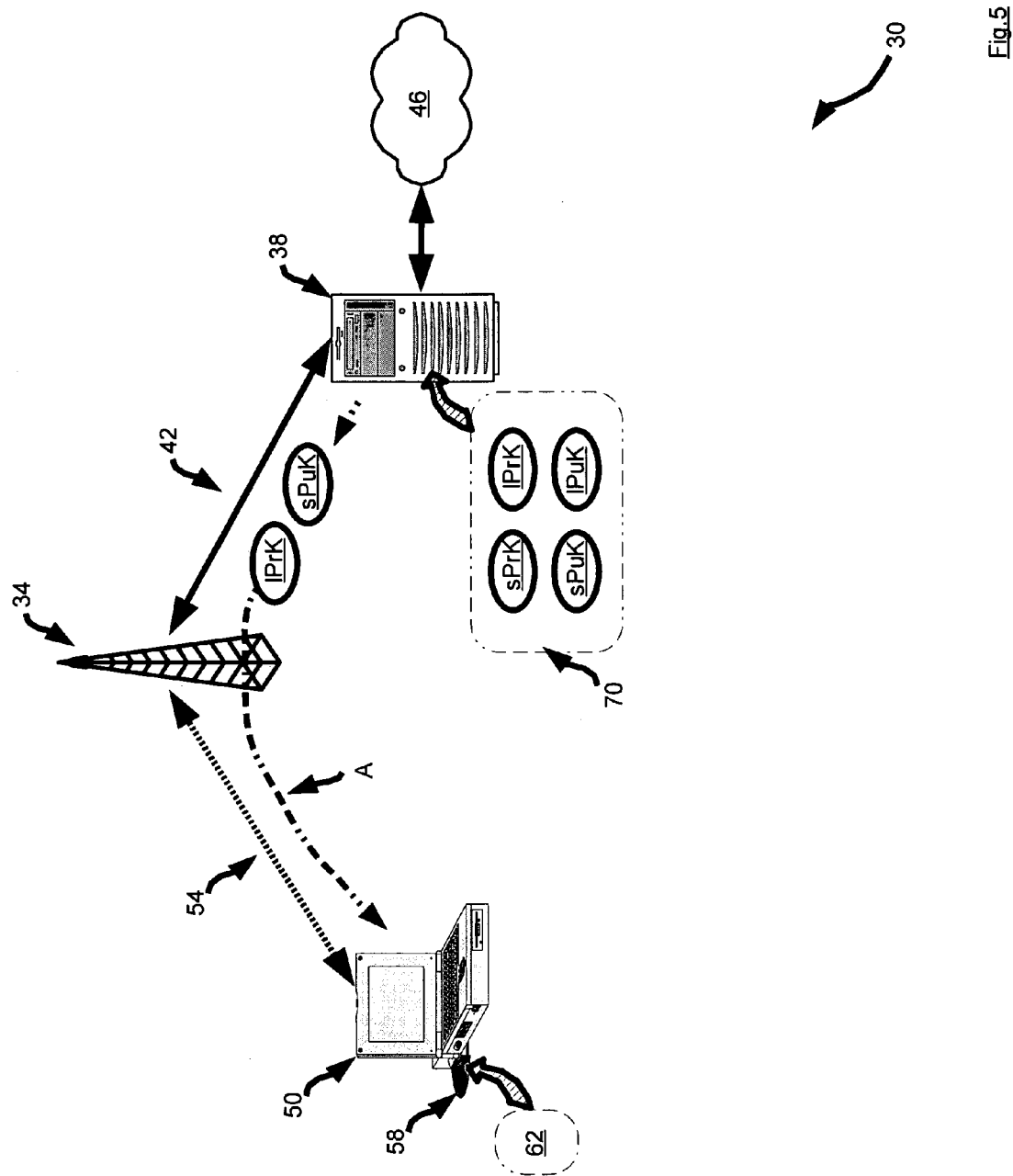
FIG. 5 shows the system of FIG. 1 including the generation of sessio keys by the server.

However, if at step 440 a valid UserID and password are entered, then method 400 advances to step 445 at which point asymmetric session keys are generated by server 38 and sent to laptop, in an encrypted format using certificate public key cPuK. Step 445 is represented in FIG. 5, wherein a set of asymmetric session keys generated by server 38 are indicated generally at 70. In particular, keys 70 include: a server private key sPrK; a server public key sPuK; a laptop private key lPrK; and a laptop public key lPuK. FIG. 5 also shows a server public key sPuK and a laptop private key lPrK being sent back to laptop 50 along the pathway indicated at A, which is encrypted by server 38 using certificate public key cPuK so that it can be decrypted by laptop 50 using certificate public key cPrK.

At step 450, the keys sent along pathway A are received by laptop 50 and installed in the usual manner. At this point, method 400 advances to step 455 and communications are conducted in the usual manner. More specifically, communications sent from laptop 50 to server 38 are encrypted by laptop 50 using server public key sPuK, which are decrypted by server 38 using server private key sPrK. Conversely, communications sent from server 38 to laptop 50 are encrypted by server 38 using laptop public key lPuK, which are decrypted by laptop 50 using laptop private key lPrK.

Method 400 then cycles between step 455 and step 460, periodically cycling to step 460 so a determination can be made as to whether the login is still valid. As long as the login is still valid, then method 400 will return to step 455. If it is invalid, then method 400 will end, expiring session keys 70 and otherwise preventing any further communications between laptop 50 and server 38.

A variety of criteria can be used at step 460 to determine whether the login remains valid. In particular, if there is a predefined period of inactivity passes, during which no communications are conducted at step 455, then it can be desired to terminate the login, expire session keys 70, and end method 400. By the same token, it can be desired to simply expire the login after a predefined period of time, regardless of whether there has been inactivity. Other criteria will now occur to those of skill in the art.

Figure 6:
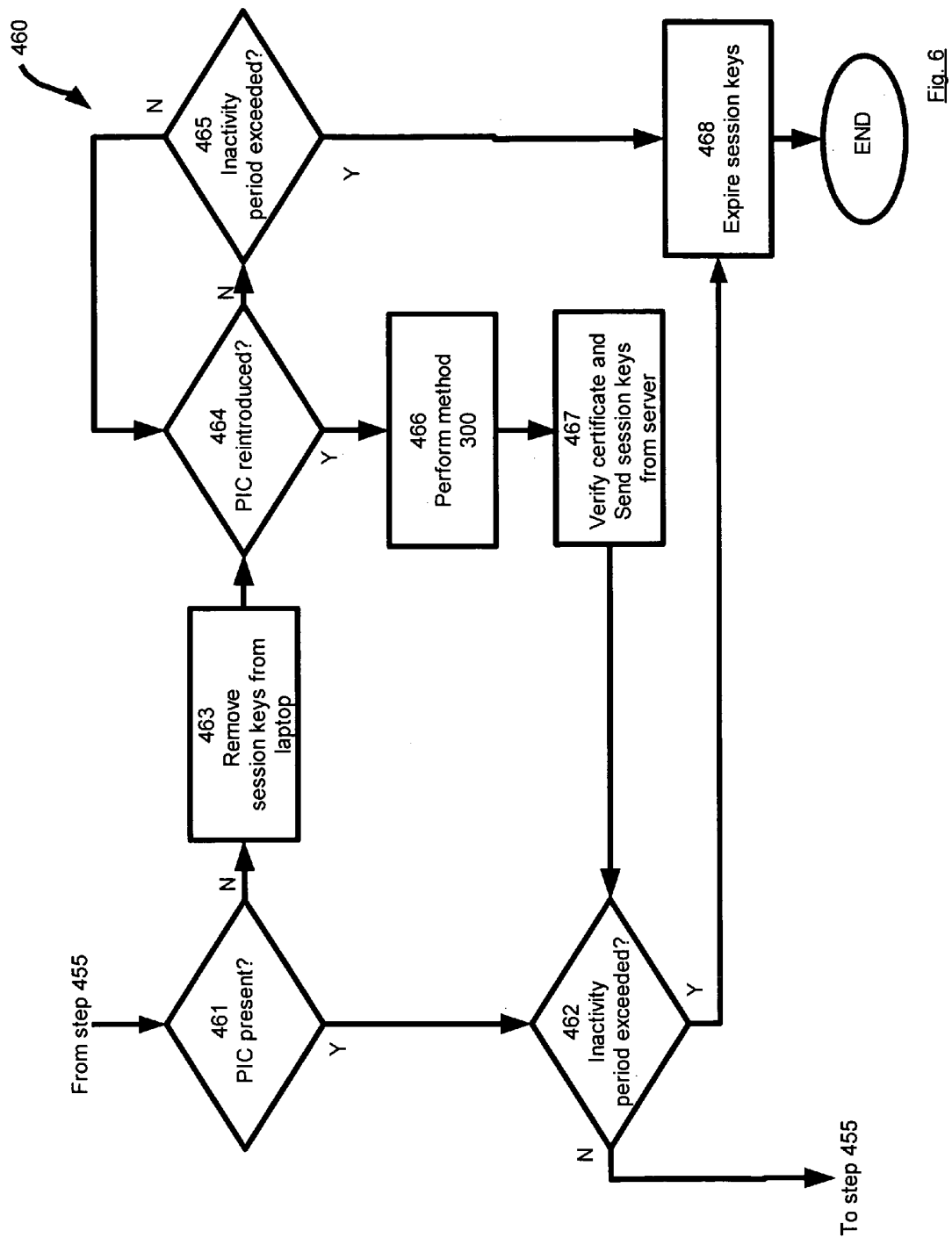
FIG. 6 shows a series of substeps that can be used to perform one of the steps in the method of FIG. 4.

FIG. 6 shows a series of sub-steps that can be used as one specific way to perform step 460. At step 461 it is determined whether the PIC is still present. Continuing with the example above, this step is performed by laptop 50 which continually monitors for the presence of PIC 58 in the USB port on laptop 50. If PIC 58 is still present, then the method proceeds to step 462 at which point it is determined whether a period of inactivity has been exceeded. Again, this period can be defined for any desired time period. In a police services application, such a period may be the duration of a shift, as it is assumed that the officer is no longer working after the end of a shift and therefore no longer has need to access server 38. The inactivity period at step 462 is exceeded, then the method advances to step 468, at which point session keys 70 are expired, and the officer is logged-out of server 38 thereby terminating access to server 38.

Returning again to step 461, however, if PIC 58 is no longer found to be present in the USB port of laptop 50, then the method advances from step 461 to step 463, at which point certificate 66, (including certificate public key cPuK and certificate private key cPrK) and session encryption keys lPrK and sPuK are removed from laptop 50. This is performed automatically by install file IF as part of its final functions once PIC 58 is removed from laptop 50. At this point, it should now be apparent that laptop 50 can no longer be used to access server 38. However, the officer that owns PIC 58 is still technically logged-in to server 38, as session keys 70 remain intact.

At step 464, it is determined whether the PIC has been reintroduced. This step is performed by laptop 50 (or, as will be explained in greater detail below, other computing devices that may from time to time connect to system 30). If PIC 58 is not reintroduced, the method advances to step 465, at which point it is determined whether an inactivity period has been exceeded. Step 465 is performed by server 38 and functions substantially the same way as step 462. Thus, if the inactivity period is exceeded, the method advances to step 468, session keys 70 are expired, and the officer is deemed logged out of server 38.

However, if at step 464 PIC 58 is reintroduced then the method advances to step 466, at which point method 300 is performed again in order to re-establish certificate 66 inside laptop 50.

Next, at step 467, certificate 66 is resent to server 38, verified, and the session encryption keys lPrK and sPuK are resent from server 38 to laptop 50. (In the event that the certificate 66 has been revoked during this interval, then the session keys 70 will be expired and the method will end, in much the same manner as previously describe in relation to step 415 and 468). The resending of the session encryption keys lPrK and sPuK is performed in substantially the same manner as previously described in relation to step 445, with the exception that these encryption keys are already present on server 38 and need not be regenerated but simply sent to laptop 50 along pathway A shown in FIG. 5.

At this point, the method advances from step 467 to step 462, which is performed in the manner previously-described.

It can now be seen that method 400 in conjunction with the steps shown in FIG. 6 allow a police officer (or other user) to log in to server 38 once, but then to remove and reintroduce PIC 58 into laptop 50 without having to re-login to server 38 each time, provided that the predefined time period of inactivity is not exceeded.

Figure 7:
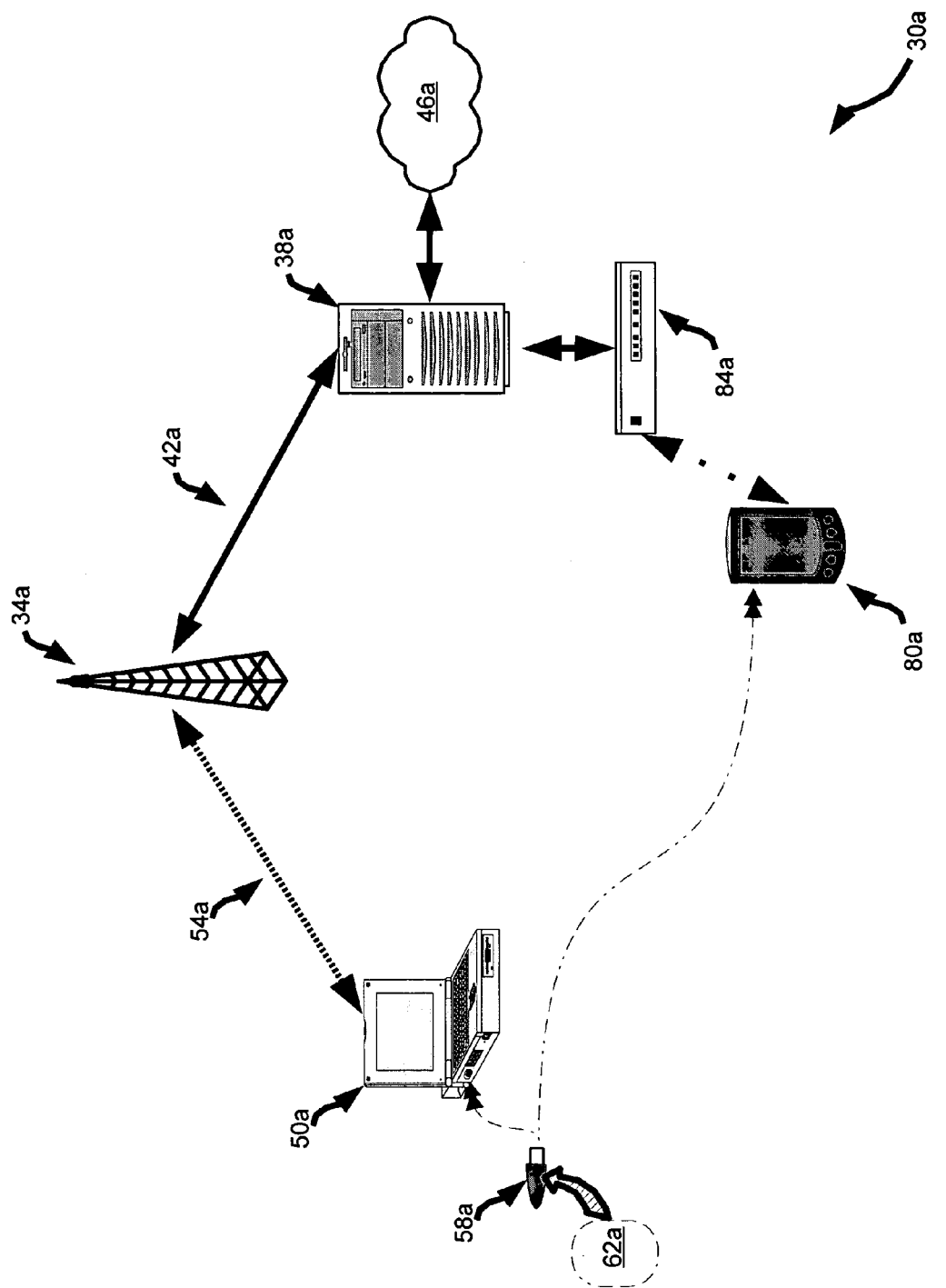
FIG. 7 is a schematic representation of a security system in accordance with another embodiment of the invention.

By the same token, method 400 in conjunction with the steps shown in FIG. 6 allow a police officer to remove PIC 58 from laptop 50 and then reintroduce PIC 58 into another computing device, without having to re-login to server 38 each time, provided that the predefined time period of inactivity is not exceeded. An example of this variation is illustrated in FIG. 7, which shows a security system 30*a* in accordance with another embodiment of the invention. System 30*a* includes the same elements as- system 30, and like elements in system 30*a* bear the same reference as their counterparts in system 30, except followed with the suffix "a". System 30*a* also includes a wireless personal digital assistant ("WPDA") 80*a* that is based on 802.11g (or its variants or any other type of local wireless access or the like). WPDA 80*a* includes the same functionality for performing method 300, and its corresponding roles in method 400, as previously discussed in relation to laptop 50. System 30*a* also includes an 802.11g wireless access point ("WAP") 84*a* that is connected to server 38*a*. It is thus assumed that WAP 84*a* is located inside a police facility, such a police headquarters or the like, near server 38a. However, in other embodiments WAP 84a could be located in any other suitable location.

Figure 8:
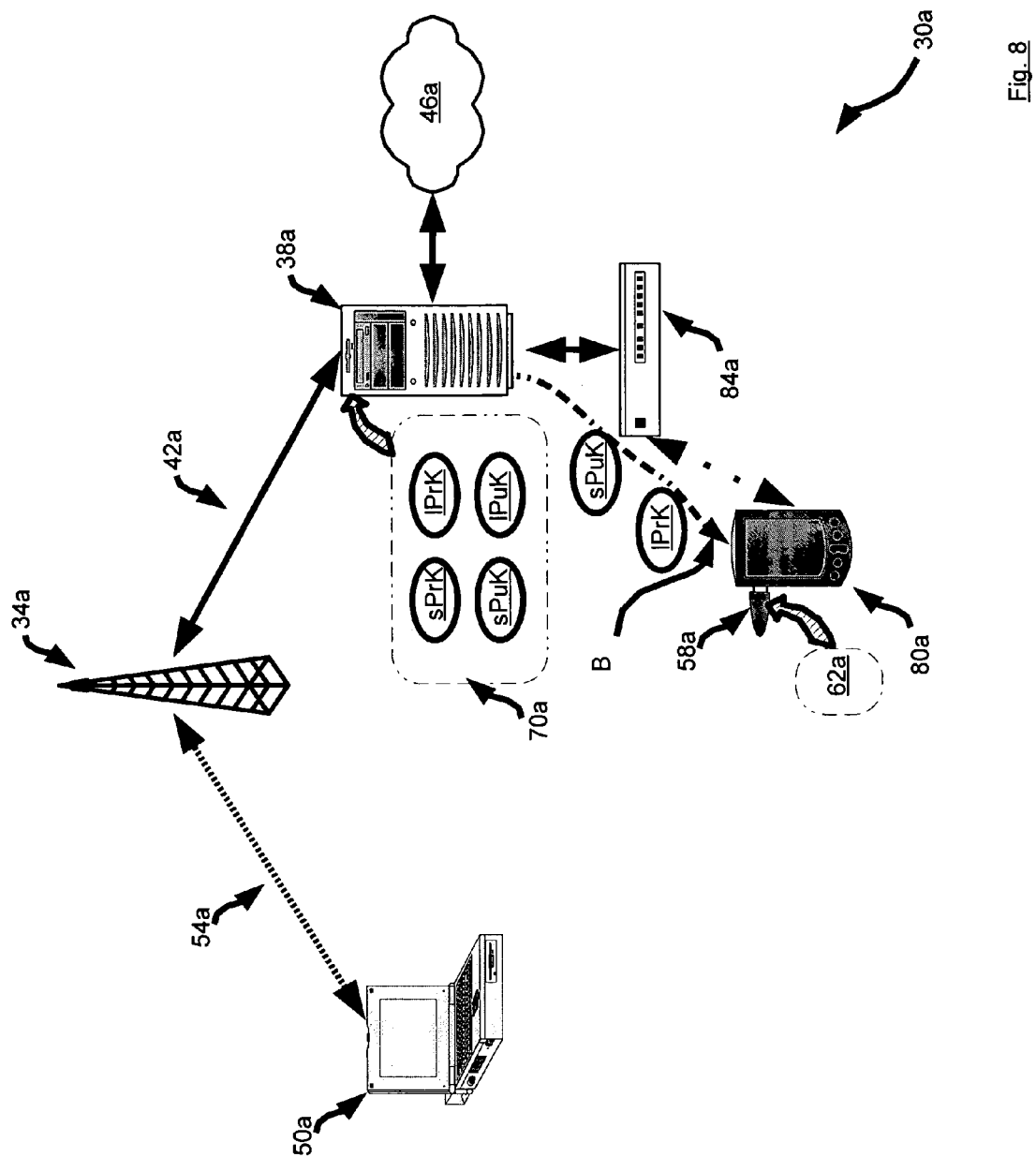
FIG. 8 is shows the security system of FIG. 7 wherein the personal integrated circuit is attached to the wireless PDA.

Accordingly, the sub-steps for performing step 460 in FIG. 6 can be used to allow an officer initially using laptop 50a to remove the PIC 58a from laptop 50a and insert PIC 58a into WPDA 80a, and thus once WPDA 80a is in range of WAP 84a, then the officer will be able to resume communicating with server 38a. In this example, it is assumed that method 300 is initially performed on laptop 50a as PIC 58 is initially inserted into laptop 50a. Method 300 and steps 410-455 are performed in the manner previously described. However, during the performance of the sub-steps in FIG. 6, it is assumed that steps 461 and 463 are performed by laptop 50a, but that step 464 and 466 are performed on WPDA 80a, and that at step 467 the pre-existing session encryption keys lPrK and sPuK are sent from server 38a to WPDA 80a. This is illustrated in FIG. 8, along pathway B.

It should now be apparent that the officer can switch back and forth between using laptop 50a, WPDA 80a (and any other substantially similar devices) by moving PIC 58a between the devices, without having to re-login to server 38 each time.

Figure 9:
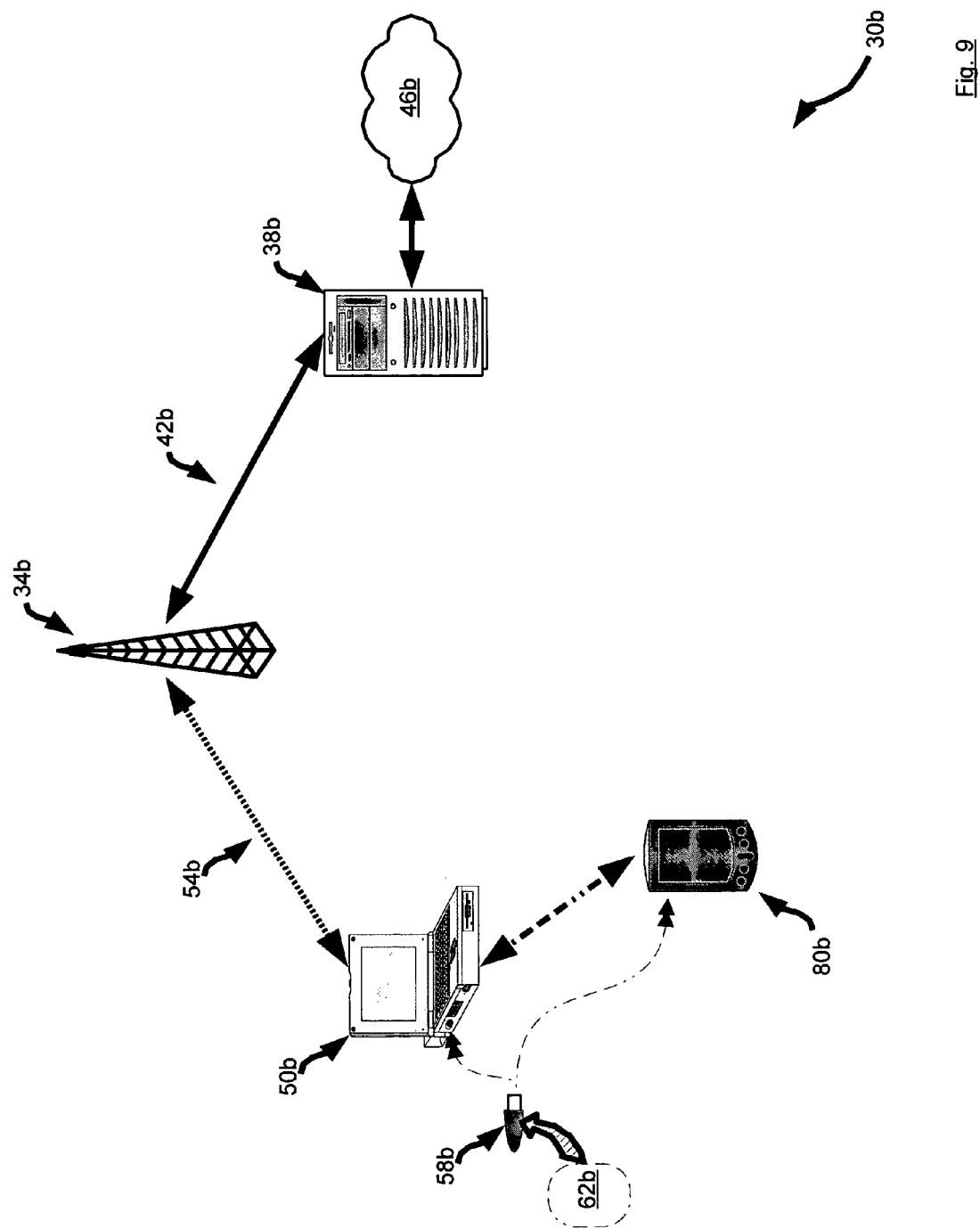
FIG. 9 is a schematic representation of a security system in accordance with another embodiment of the invention.

Referring now to FIG. 9 a security system in accordance with another embodiment of the invention is indicated generally at 30b. System 30b includes the same elements as system 30a, and like elements in system 30b bear the same reference as their counterparts in system 30a, except with the suffix "b". While system 30a included a WAP 84a, for communicating with server 38a, however, in system 30b, laptop 50b includes all of the functionality of laptop 50a, but also includes hardware and software to render laptop 50b operable to act as an 802.11g access point, and is therefore able to act as a bridge between WPDA 80b and base station 34b. Accordingly, WPDA 80b is able to conduct communications with server 38b via laptop 50b and base station 34b. Using system 30b, an officer is able to login to laptop 50b using method 300 and login to server 38b using method 400 in the manner previously described in relation to system 30. However, once logged in, using system 30b an officer is able to remove PIC 58b from laptop 50b, then insert PIC 58b into WPDA 80b and resume communications with server 38b without having to re-login to server 38b. At this point, the officer is free to wirelessly interact with server 38b in the proximity of his or her police cruiser as long as he or she remains in range of the 802.11g connection made available from laptop 50b.

Figure 10:
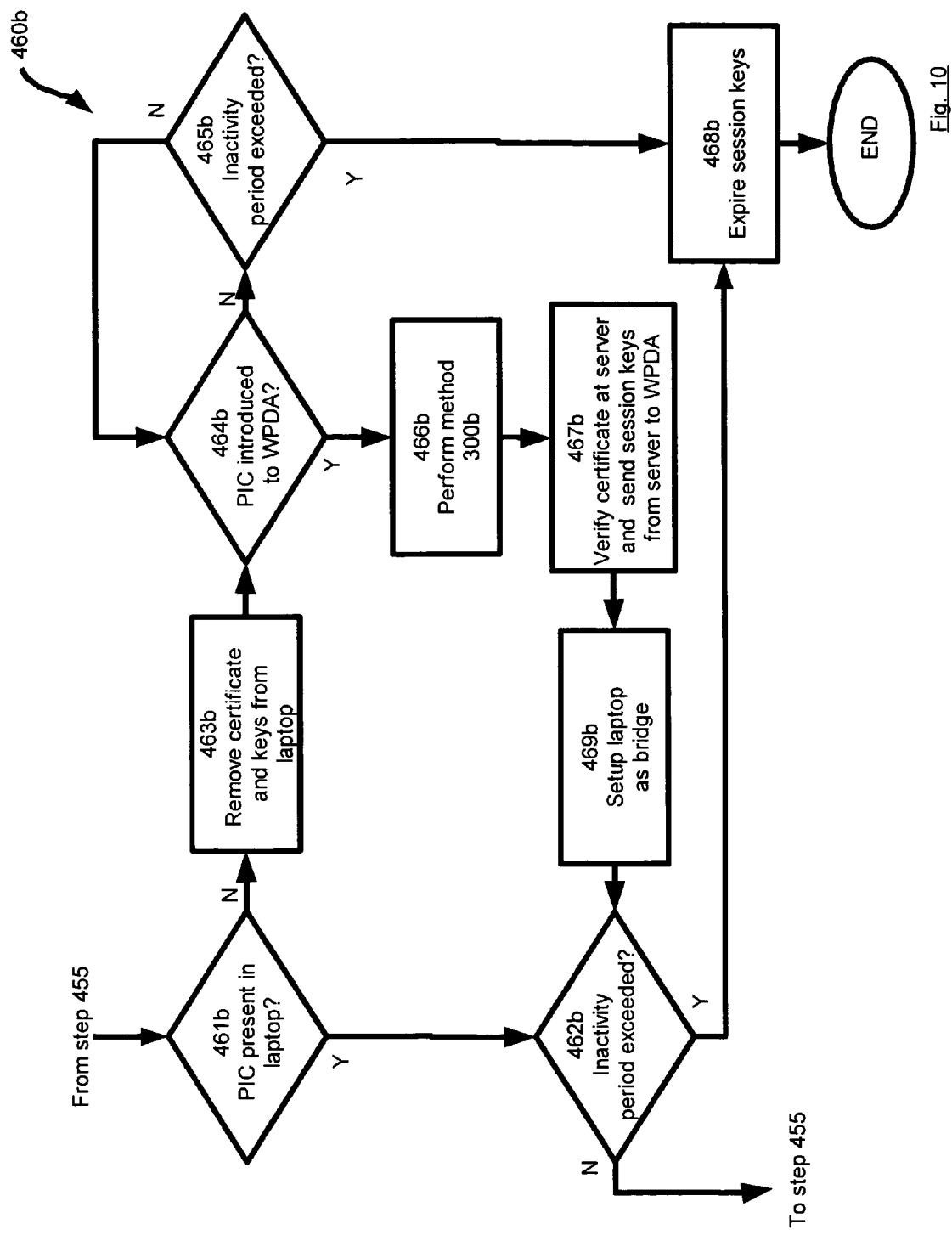
FIG. 10 shows a series of substeps that can be used to perform one of the steps in the method of FIG. 4; and, FIG. 11 shows a series of substeps that can be used to perform one of the steps in the method of FIG. 10.
Figure 11:
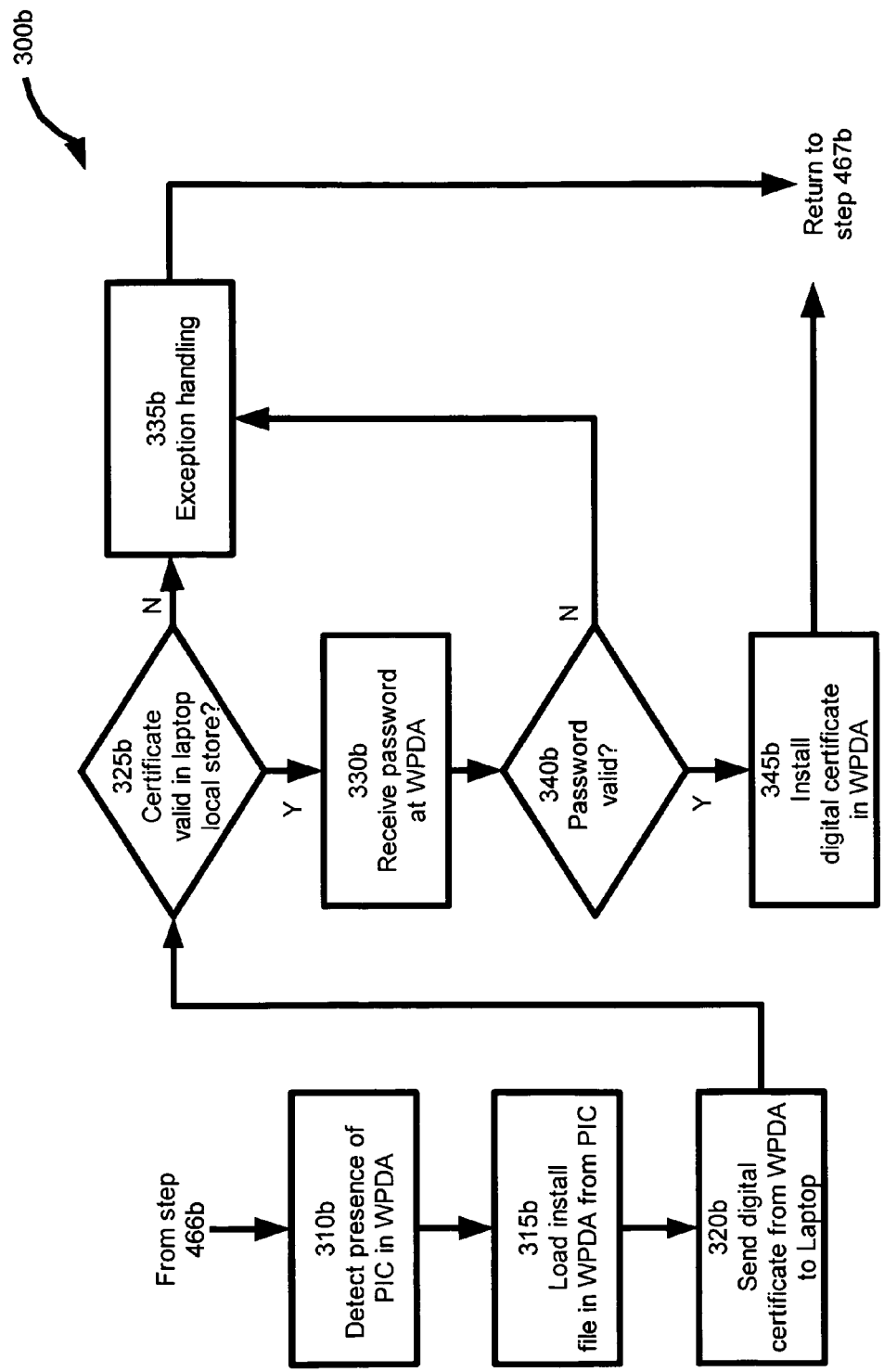

FIGS. 10 and 11 show flow charts containing methods that can be used to effect this transition from laptop 50b to WPDA 80b. FIG. 10 shows a series of substeps that can be used to perform step 460 of method 400. These substeps are labeled as method 460b in FIG. 10. At step 461b it is determined whether PIC 58b is still present in laptop 50b. If not, method 460b advances to step 463b and certificate 66 and session keys lPrK and sPuK are removed from laptop 50b. At step 464b, WPDA 80b waits for PIC 50b to be inserted therein. (If it is not inserted within a given time period then method 460b will terminate via steps 465b and 468b as previously described.) Once PIC 50b is inserted into WPDA 80b, method 460b advances to step 466b, at which point method 300b is performed.

Method 300b is shown in FIG. 11, and performs similarly to method 300 except it is performed in a distributed manner across laptop 50b and WPDA 80b. Steps 310b and 315b are performed substantially the same way as steps 310 and 315, except that they are performed in WPDA 80b and not in laptop 50b. At step 320b, digital certificate 66 is sent from WPDA 80b to laptop 50b. Step 325b is performed substantially the same way as step 325, as digital certificate 66 is compared with a local cache of revoked certificates that is kept on laptop 50b. If the certificate is valid, then method 300b advances to step 330b, otherwise method 300b advances to step 335b for exception handling, which can be performed as previously discussed in relation to step 335 of method 300. At step 330b, a dialog box is presented on WPDA 80b that asks for the officer to enter in a password. At step 340b, WPDA 80b verifies that the password received at step 330b matches password PW and if so then method 300b advances to step 345b, otherwise method 300b advances to step 335b for exception handling, which can be performed as previously discussed in relation to step 335 of method 300. At step 345b, digital certificate 66, and private key cPrK are installed on WPDA 80b, in substantially the same manner as described in relation to step 345 of method 300.

Figure 12:
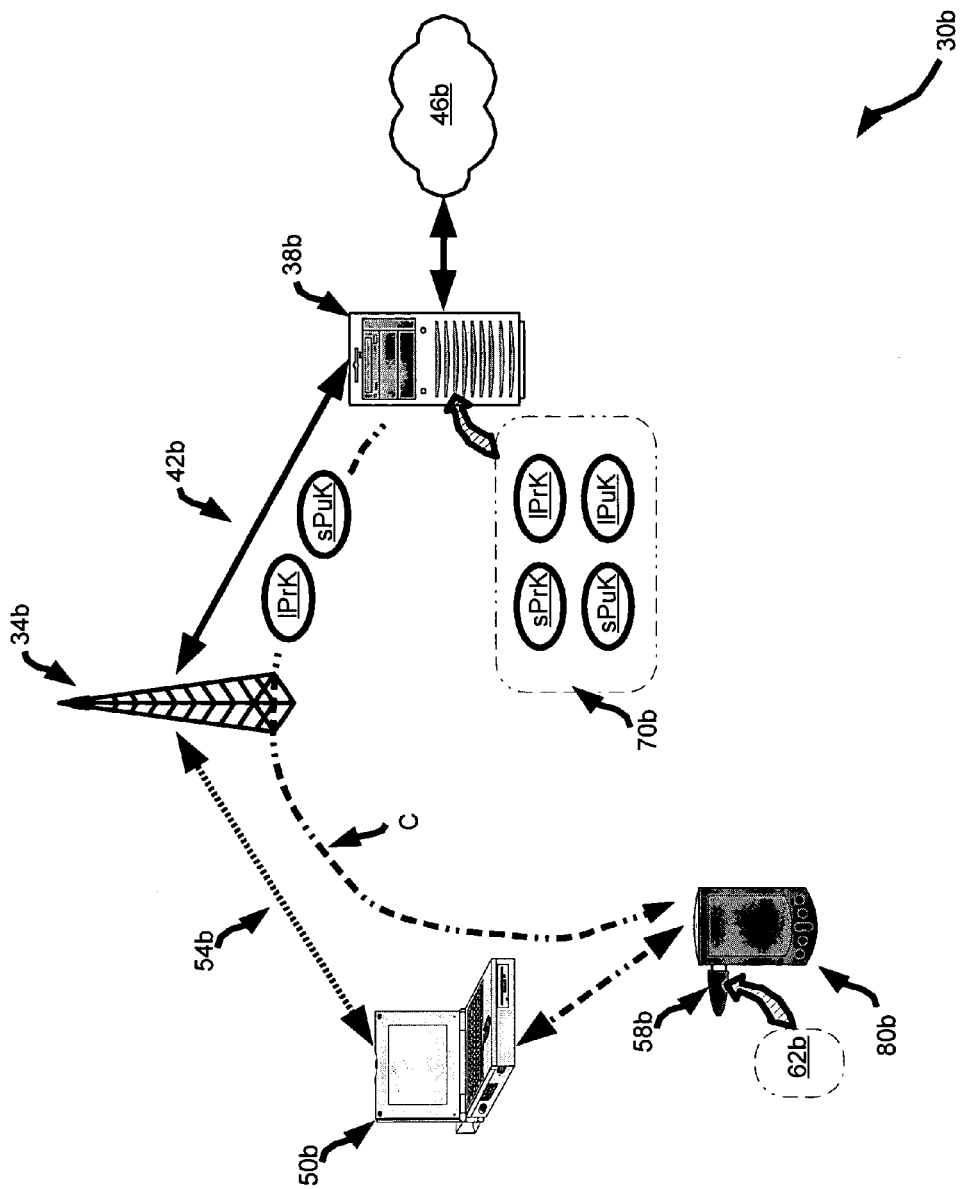
FIG. 12 is a schematic representation of a security system in accordance with another embodiment of the invention.

At this point the method returns to step 467b of method 460b. Step 467b is performed in substantially the same manner as step 467 of method 400, as the certificate 66b is sent to server 38b for verification, and session keys lPrK and sPuK are sent to WPDA 80b. This step is represented in FIG. 12, as session keys lPrK and sPuK are sent from server 38b to WPDA 80b along pathway C.

Next, method 460b advances to step 469b, and laptop 50b is set up as a bridge between WPDA 80b and server 38b. More specifically, communications over link 54b and the 802.11g link between WPDA 80b and laptop 50b are encrypted and decrypted by WPDA 80b using session keys lPrK and sPuK in substantially the manner as described in relation to system 30, however, rather than the keyboard and screen of laptop 50b being used to receive user input and to present user output, that user input and user output occurs on WPDA 80b and is transmitted over the 802.11g link between WPDA 80b and laptop 50b. Thus, at this point method 460b advances from step 469b to step 462b, which is performed in substantially the same manner as described in relation to step 462.

Figure 13:
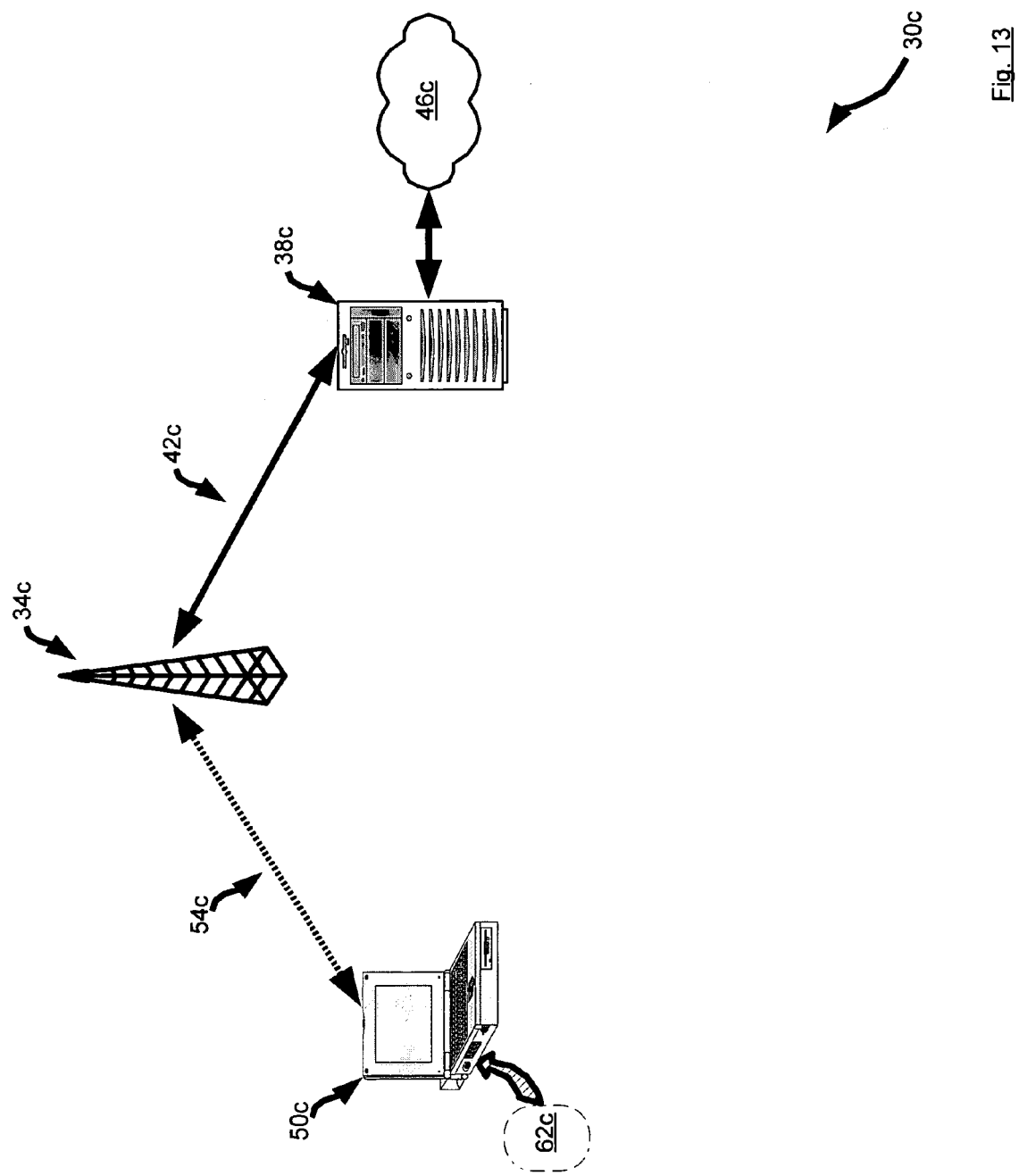
FIG. 13 is a schematic representation of a security system in accordance with another embodiment of the invention.

Referring now to FIG. 13 a security system in accordance with another embodiment of the invention is indicated generally at 30c. System 30c includes the same elements as system 30, and like elements in system 30 bear the same reference as their counterparts in system 30, except with the suffix "c". However, while system 30 included PIC 58 in system 30c, laptop 50c has been preloaded with the entirety of datafiles 62c, thereby obviating the need for PIC 58 altogether. Accordingly, laptop 50c is able to conduct communications with server 38c via base station 34c in substantially the same manner as described before, however, without the need for actually inserting a PIC 58 into laptop 50c. Using system 30c, an officer is able to login to laptop 50c using a suitably modified version of method 300 (i.e. by omitting step 310 and running install file IF directly from the locally stored copy of datafiles 62c). Then the officer can login to server 38c using a suitably modified version of method 400 in substantially the manner previously described in relation to system 30. Once logged in using system 30c the officer can then log out of laptop 50c, and then re-log back into laptop 50c without being logged out of server 38c, provided that the officer logs back into laptop 50c within the inactivity period described in relation to step 462 of method 460. Those of skill in the art will now recognize that such logging out of, and back into, laptop 50c has the same practical effect as removing and reinserting PIC 58 into laptop 50 in system 30.

Figure 14:
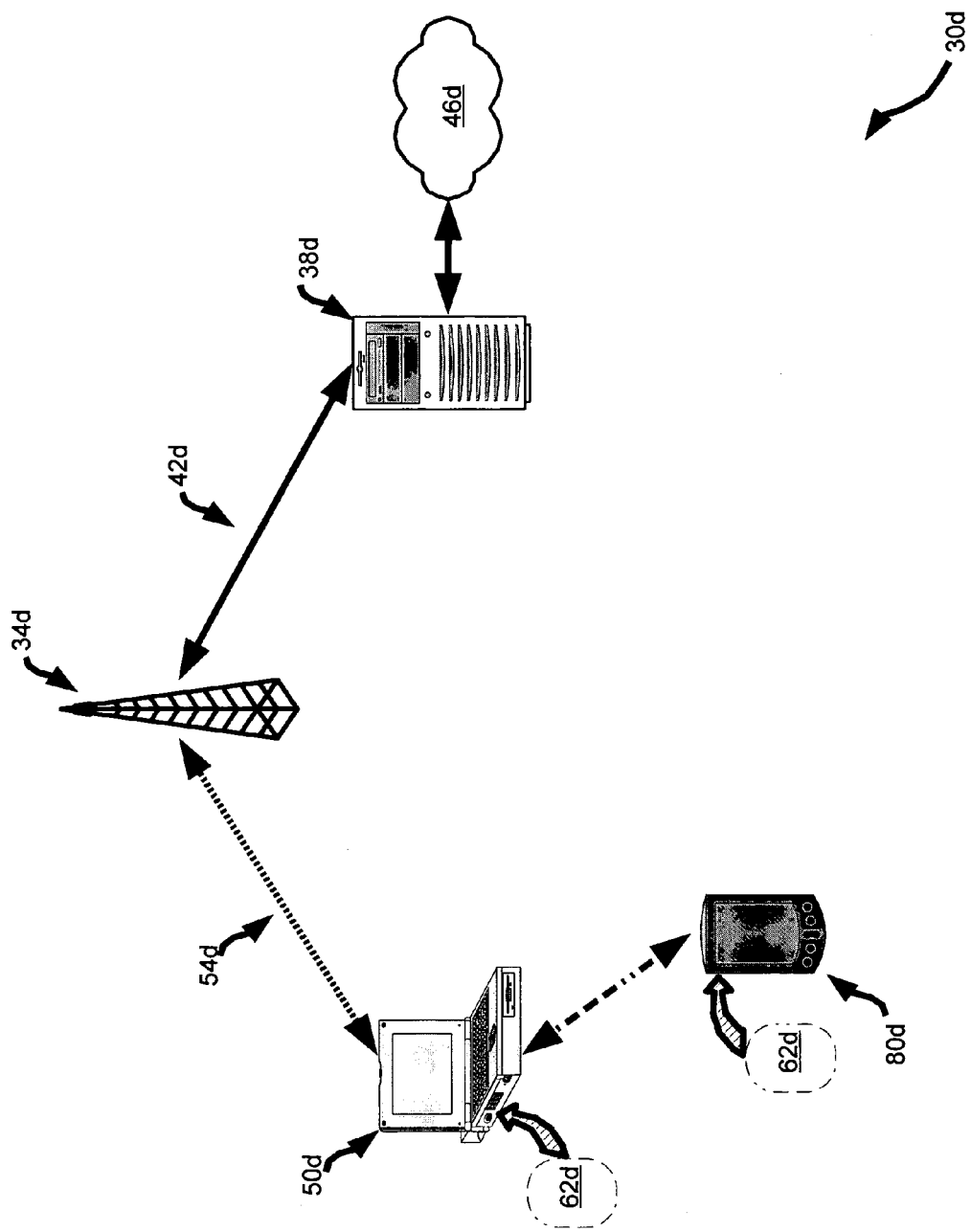
FIG. 14 is a schematic representation of a security system in accordance with another embodiment of the invention.

Referring now to FIG. 14 a security system in accordance with another embodiment of the invention is indicated generally at 30d. System 30d includes many of the same elements, though slightly modified, as systems 30, 30a, 30b and 30c. Continuing with the same nomenclature, like elements in system 30d bear the same reference as their counterparts except with the suffix "d" in system 30d. However, like system 30c, laptop 50d has been preloaded with datafiles 62d, and by the same token WPDA 80d preloaded with datafiles 62d thereby obviating the need for PIC 58. Accordingly, laptop 50d is able to conduct communications with server 38d in the same manner as described in relation to system 30c. Similarly, WPDA 80d can communicate with server 38d in much the same manner as described in relation to system 30b or system 30a, but again, without the need for PIC 58. For example, using system 30d, an officer is able to login to laptop 50d using a suitably modified version of method 300 (i.e. by omitting step 310 and running install file IF directly from the locally stored copy of datafiles 62d.) Then the officer can login to server 38d using method 400 in substantially the manner previously described in relation to system 30. Once logged in using system 30d, the officer can then log out of laptop 50d, and then log into WPDA 80d, without being logged out of server 38c, provided that the officer logs into WPDA 80d within the inactivity period described in relation to step 462 of method 460. Those of skill in the art will now recognize that such logging out of laptop 50d and into WPDA 80d, has the same practical effect as removing PIC 58b from laptop 50b and reinserting PIC 58b into WPDA 80b in system 30b.

Figure 15:
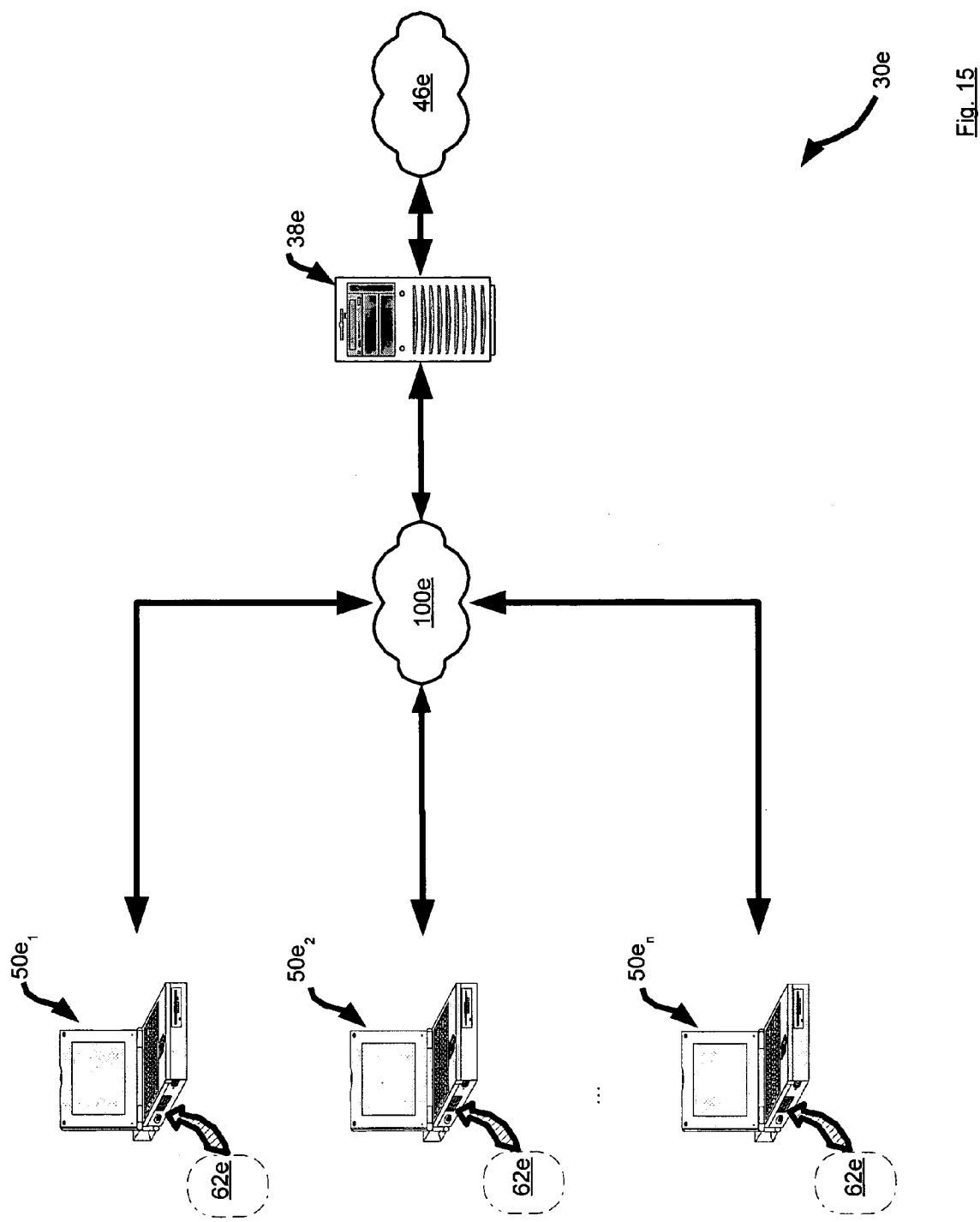
FIG. 15 is a schematic representation of a security system in accordance with another embodiment of the invention.

Referring now to FIG. 15 a security system in accordance with another embodiment of the invention is indicated generally at 30e. System 30e includes many of the same elements, though modified, as systems 30, 30a, 30b, 30c and 30d. Continuing with the same nomenclature, like elements in system 30e bear the same reference as their counterparts except with the suffix "e" in system 30e. However, in system 30e, server 38e is operable to connect with a plurality of different laptops, indicated in FIG. 14 as laptops $50e_1$, $50e_2$. . . $50e_n$. (Collectively laptops 50e and generically laptop 50e). Laptops 50e connect to server 38e through a network 100e. Network 100e can be any type of wired or wireless local area network, wide area network, Intranet, Internet and/or combinations thereof that provide connectivity between laptops 50d and server 38e.

Laptops 50e need not be a laptop computer and can be any type of computing device, including desktops, PDAs, cellular telephones and the like. In a present embodiment, each laptop 50e includes a copy of datafile 62b pre-installed thereon. However, it is also contemplated that datafile 62e can be dynamically loaded onto a given laptop 50e, through the use of a PIC, such as PIC 58 or the like, as described above.

Figure 16:
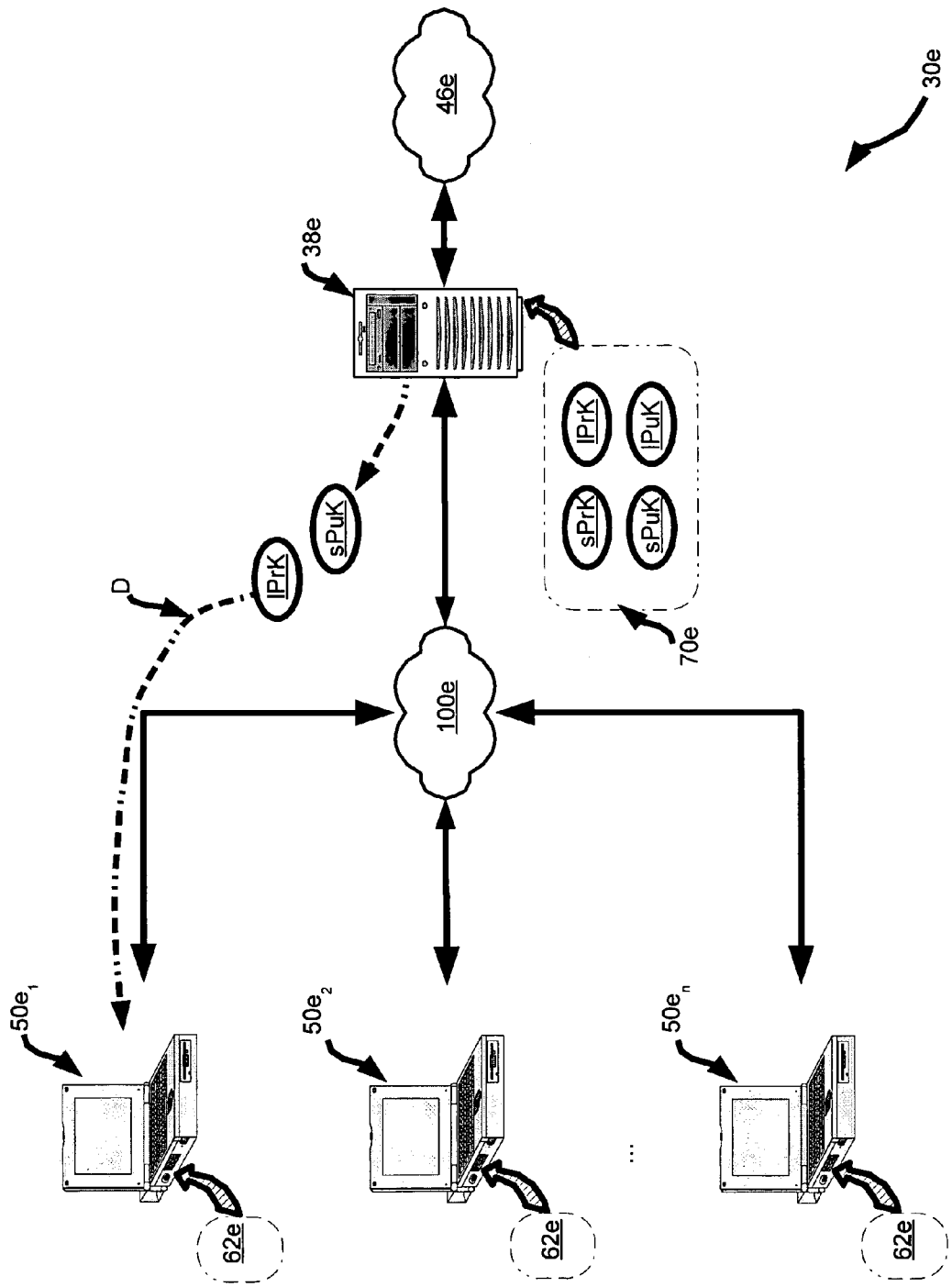
FIG. 16 shows the system of FIG. 15 during one operation.

A user at, for example, laptop $50e_1$ can thus login locally to laptop $50e_1$ using steps 320-345 of method 300. Method 400 can then be employed to log that user into server 38e, and generate a set of session keys 70e, and of which the laptop private key lPrk and server public key sPuK are sent down to laptop $50e_1$ along pathway D, as shown in FIG. 16.

Once method 400 reaches the loop at steps 455 and 460 in system 30e, the user at laptop $50e_1$ can conduct communications with server 38e and otherwise interact with server 38e and/or Internet 46e.

Figure 17:
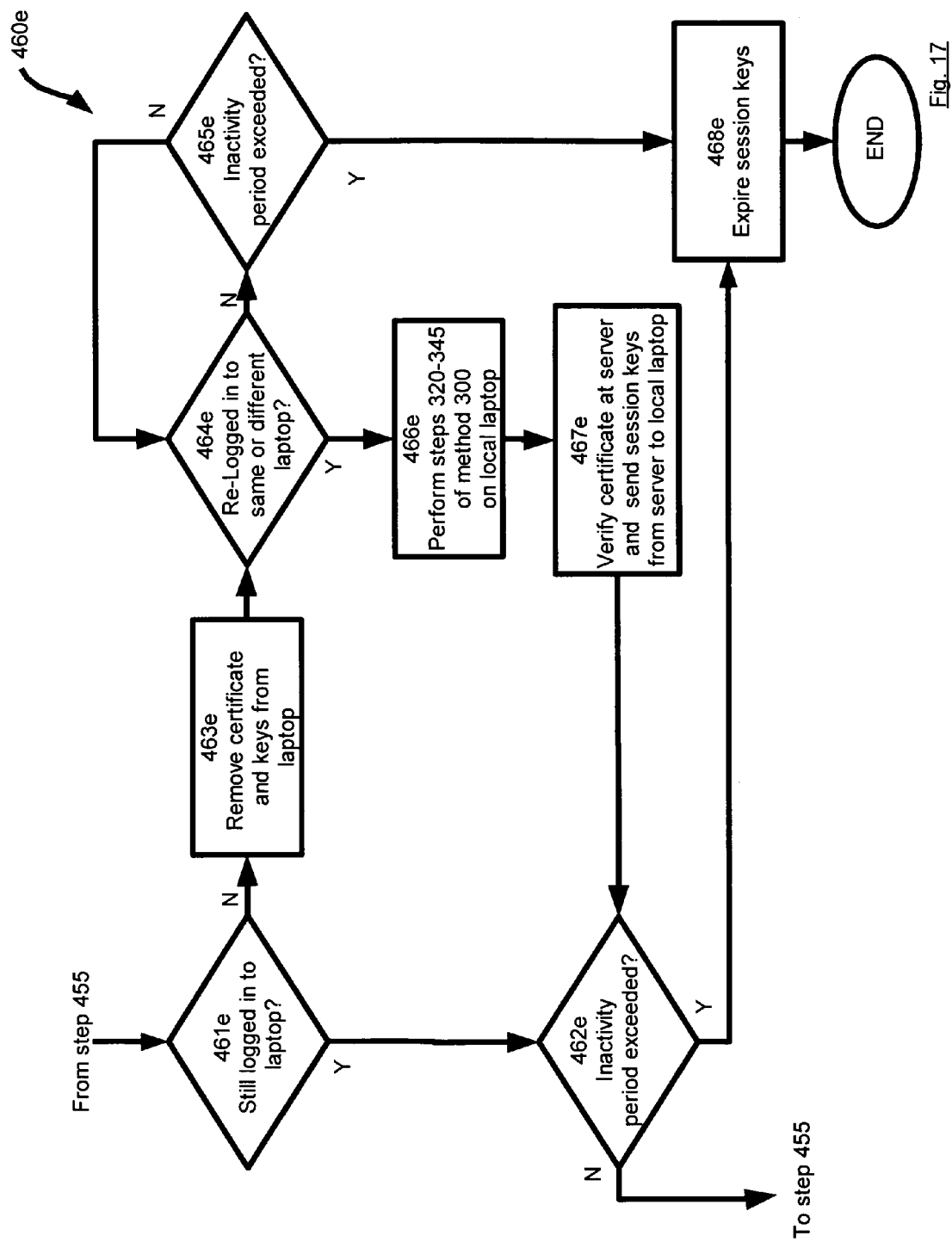
FIG. 17 shows a series of substeps that can be used to perform one of the steps in the method of FIG. 4 when being performed on the system of FIG. 15.

However, the user can also elect to discontinue accessing server 38e from laptop $50e_1$ and move to laptop $50e_2$ without causing method 400 to end and being logged out of server 38e. Referring now to FIG. 17, method 460e shows a number of substeps that can be used to perform step 460 in method 400 when method 400 operates on system 30e. At step 461e, a determination is made as to whether the user is still logged into laptop $50e_1$. If the user remains logged in, then the method advances to step 462e which is performed much as previously described in relation to step 462. However, if the user logs out of laptop $50e_1$ then the method advances to step 463e and the session keys lPrk and sPuK are removed therefrom. At step 464e, a determination is made as to whether the user has re-logged in to any one of laptops 50e. If no, then the method cycles between 464e and 465e until either the user does log in, or until the inactivity period at step 465e is exceed and all of the session keys 70e are expired and thereby logging the user out of server 38e.

Figure 18:
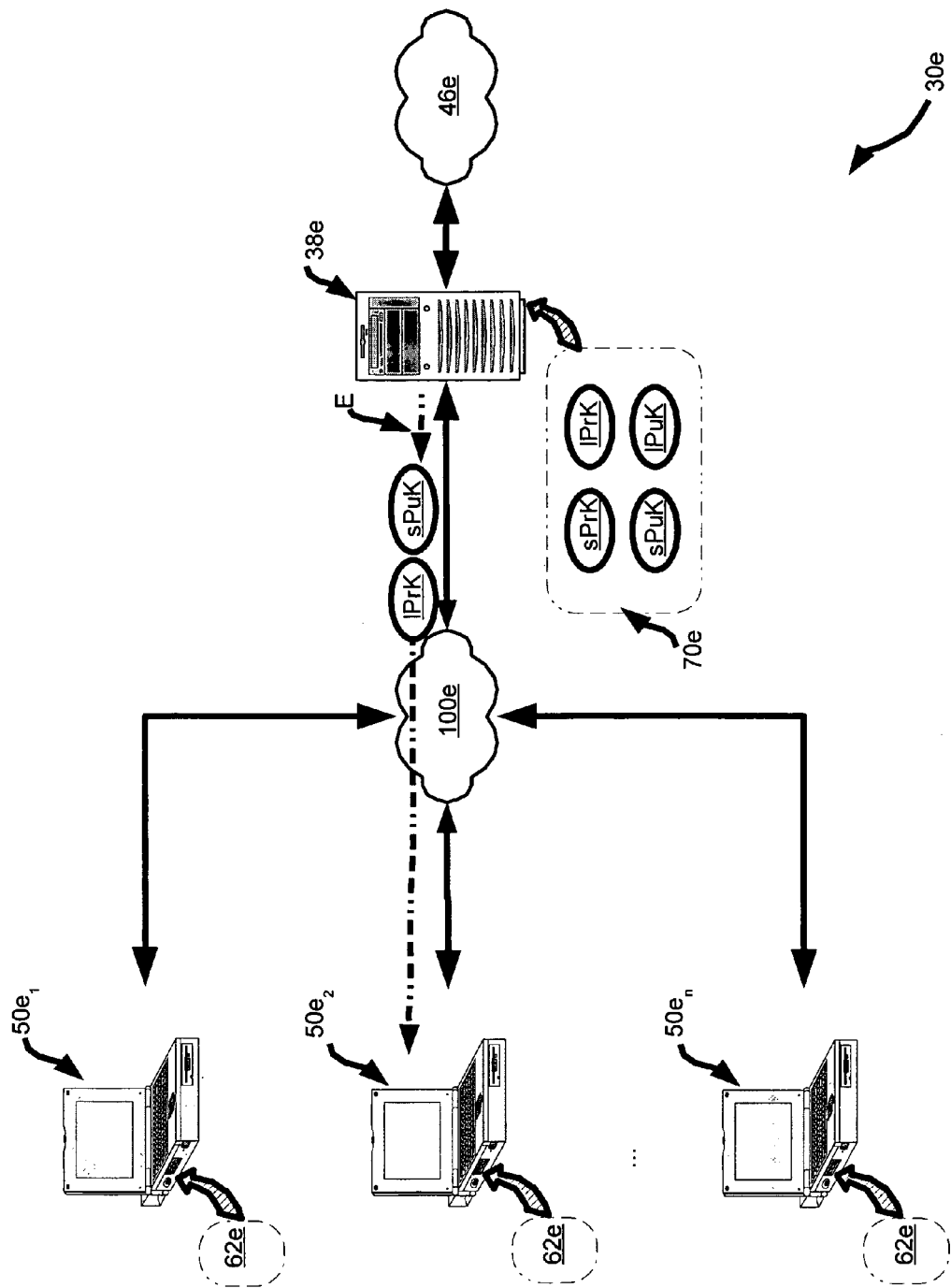
FIG. 18 shows the system of FIG. 15 during operation.

However, if at step 464e the user logs in to, for example, laptop $50e_2$, then the method advances to step 466e at which point steps 320-345 of method 300 are performed on that laptop $50e_2$. At step 467e, the certificate stored in datafile 62e is sent to server 38e, verified, and if still valid then the unexpired session keys lPrk and sPuK are sent to that laptop $50e_2$, as represented in FIG. 18 by the pathway indicated at reference "E". Referring again to FIG. 17, the method then advances to step 462e, which is performed as previously described. At this point, if the period of inactivity at step 462e is not exceeded, then method 400 returns to step 455 at which point the user at laptop $50e_2$ can continue communicating with (and otherwise interacting with) server 38e, all without ever having been logged out of server 38e. In this manner, a user can remain securely logged into server 38e, while changing which of laptops 38e that the particular user wishes to use.

Figure 19:
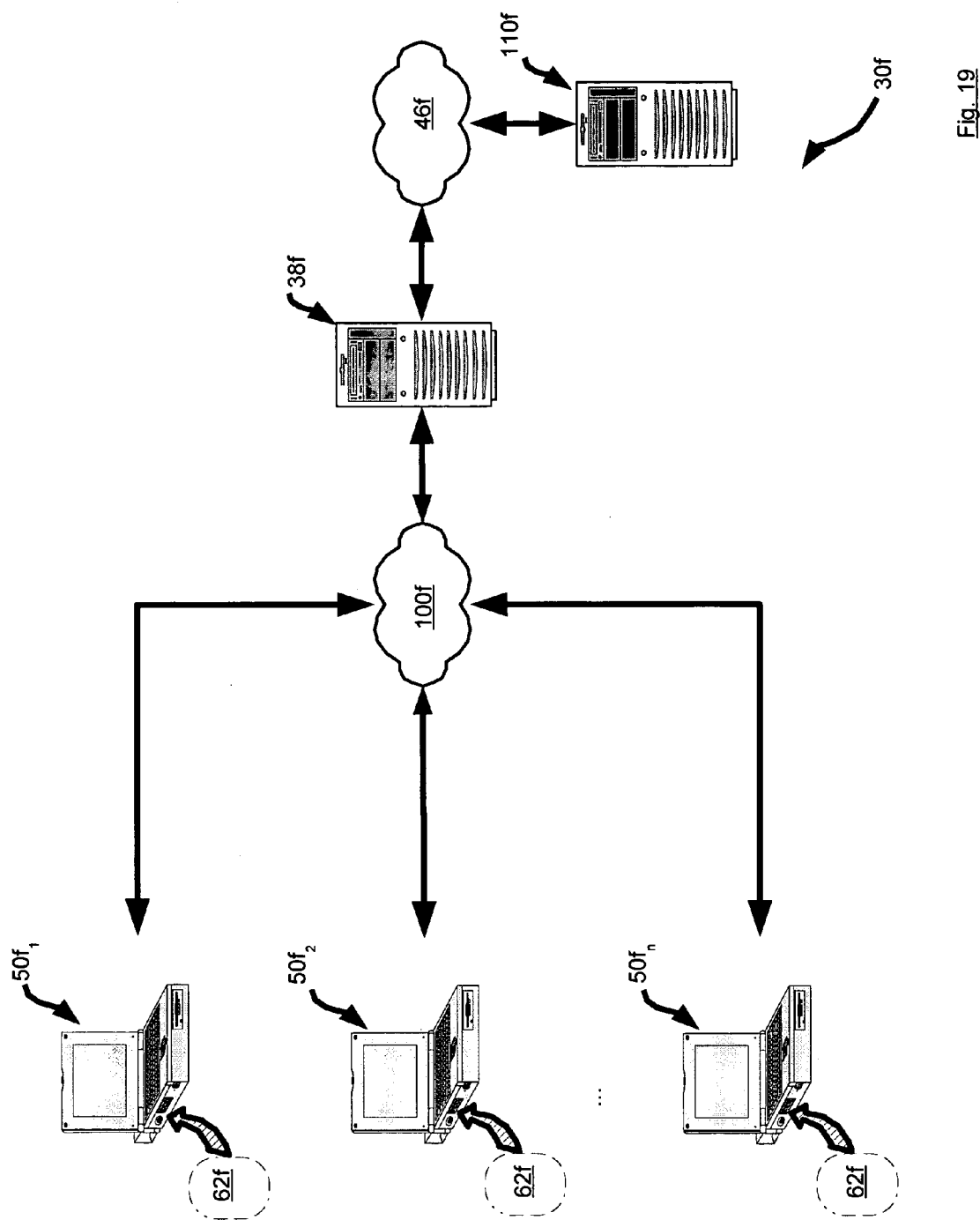
FIG. 19 is a schematic representation of a security system in accordance with another embodiment of the invention.
Figure 20:
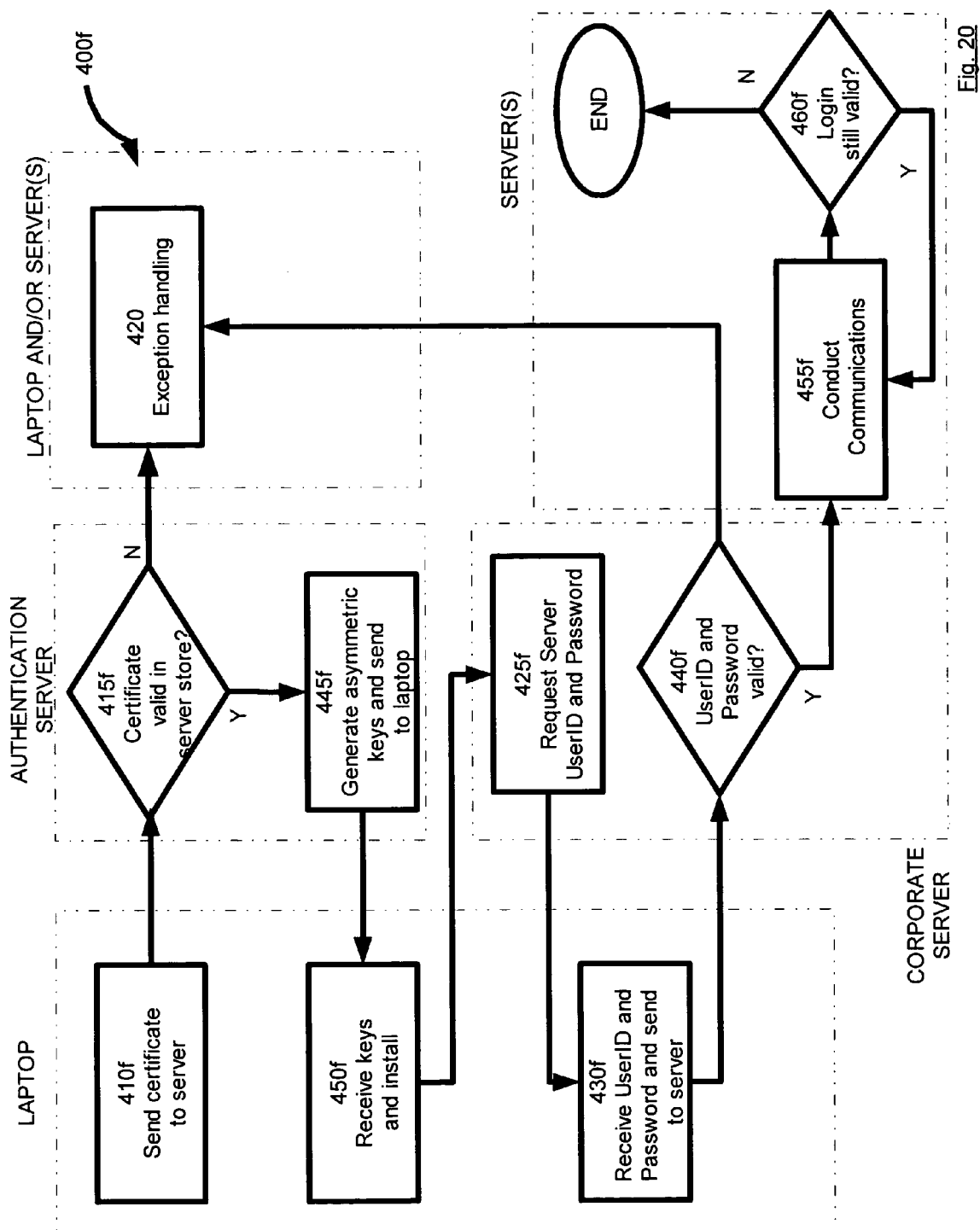
FIG. 20 shows a series of substeps that can be used to perform one of the steps in the method of FIG. 4 when being performed on the system of FIG. 19.

Referring now to FIG. 19 a security system in accordance with another embodiment of the invention is indicated generally at 30f. System 30f includes the same elements as system 30e, and like elements in system 30e bear the same reference as their counterparts in system 30e, except with the suffix "f". However, in system 30f, the functionality in server 38e is implemented in a distributed manner across an authentication server 38f, and a corporate server 110f. Corporate server 110f can be part of a broader corporate local area network, with the accompanying firewalls, routers, etc. or it can be a stand-alone server. Corporate server 110f can be any standard corporate server, responsible for maintaining files and/or emails and/or the like for corporate employees. In a present embodiment, it is contemplated that corporate server 110f supports virtual private network ("VPN") access via network 46f.

Figure 21:
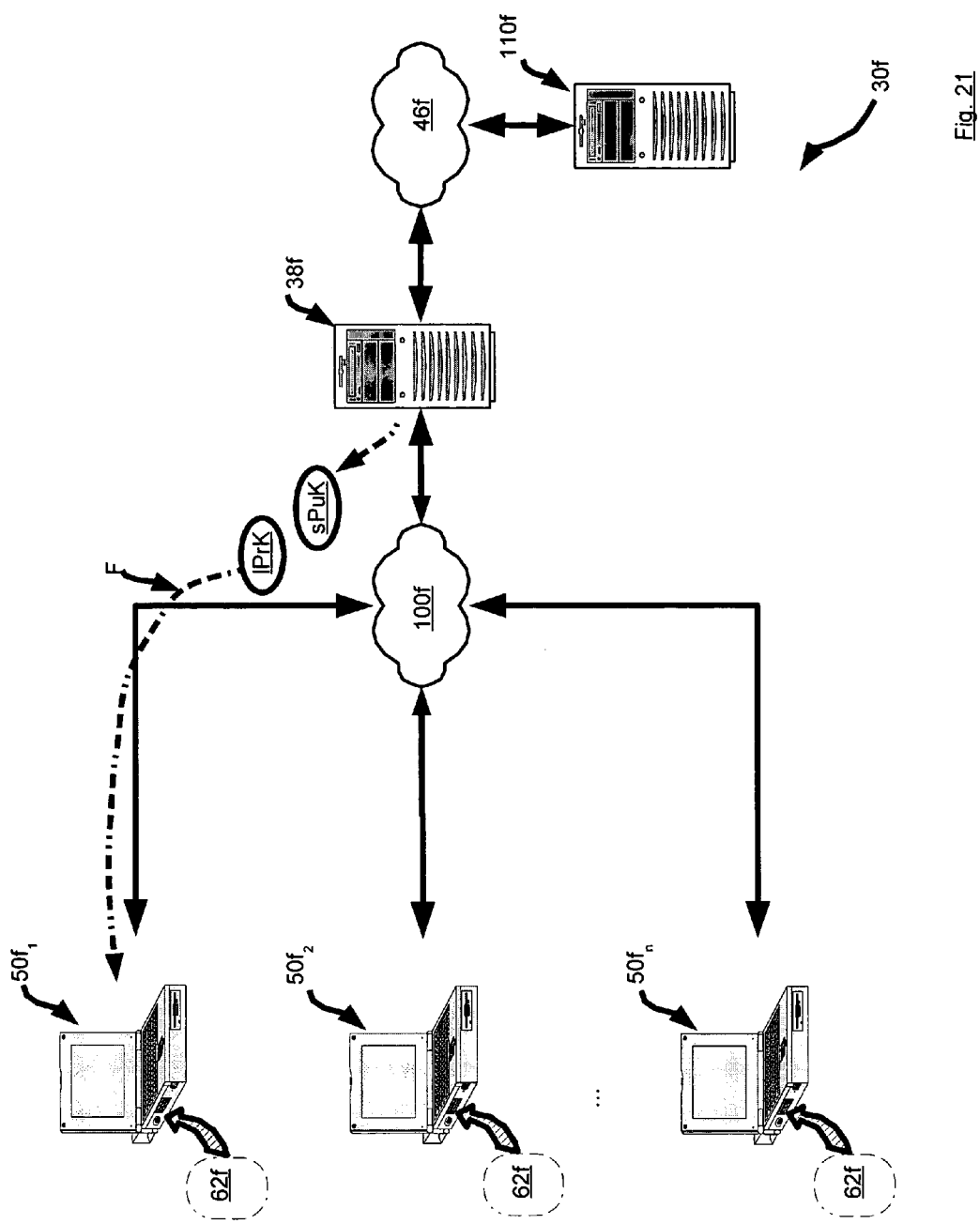
FIG. 21 shows the system of FIG. 19 during operation.
Figure 22:
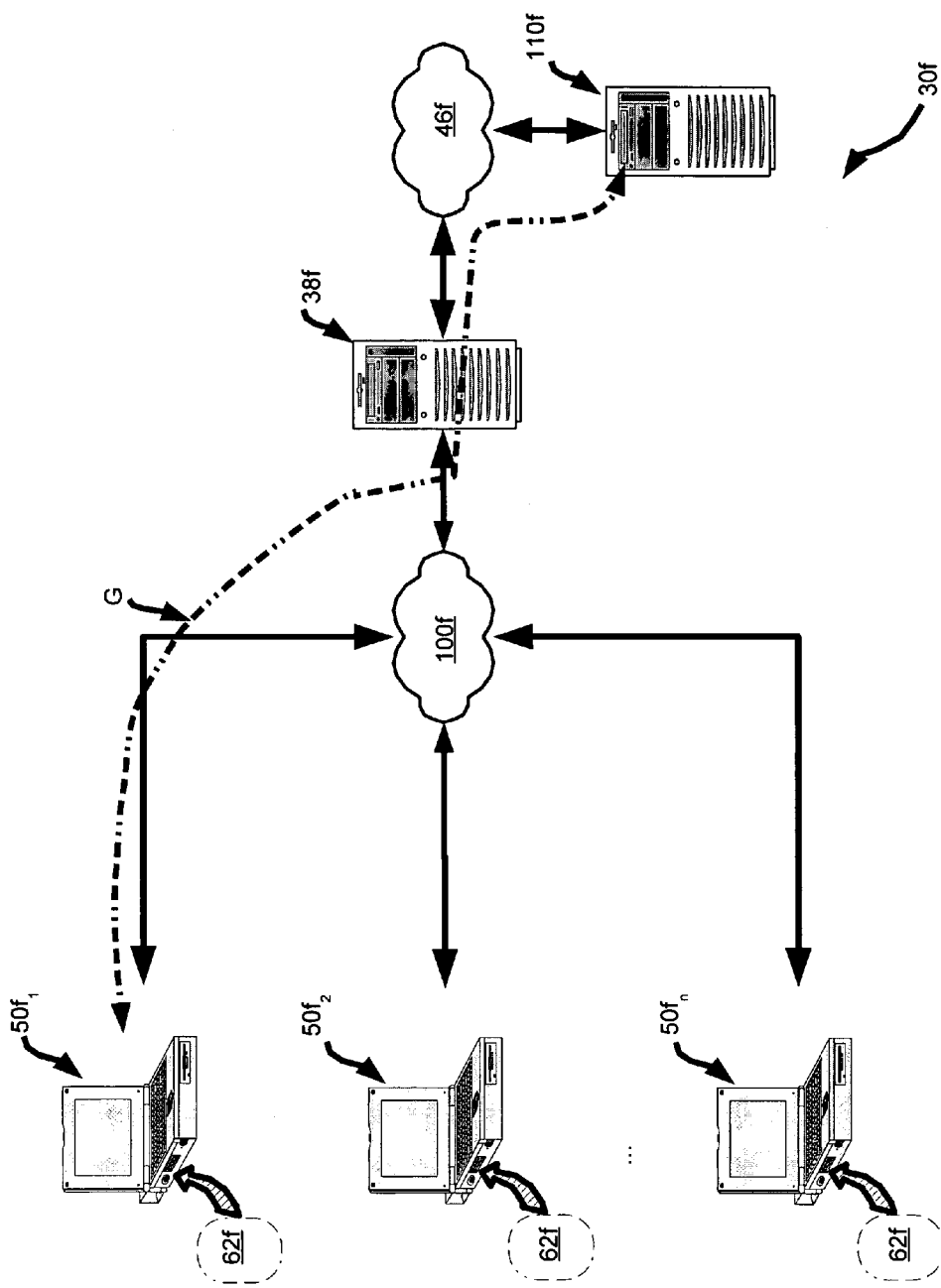
FIG. 22 shows the system of FIG. 19 during operation.

Thus, corporate server 110f includes its own login and password that is required to access the VPN offered by corporate server 110f, in the usual manner. Such a login and password can be requested as part of performing step 455 when performing method 400 on system 30f. Alternatively, the UserID and password presented at step 430 of method 400, for the purpose of authenticating the user on authentication server 30f, can simply be passed through to corporate server 110f and used thereby to log the user into corporate server 110f. As a still further variation, steps 425 and 440 can be performed solely by corporate server 110f, leaving authentication server 38f to perform step 415 (determining whether the certificate is valid) and step 445 (generate and deliver the asymmetric keys to the laptop). An exemplary implementation of the latter variation is shown in FIG. 19 as method 400f, wherein steps 415f and 445f are performed in authentication server 38f, and steps 425f and 440f are performed by corporate server 110f. Referring now to FIG. 21, system 30f is shown having a pathway indicated at reference "F" represents the performance of step 445f. Referring now to FIG. 22, system 30f is shown wherein the pathway indicated at reference "G" represents the performance of steps 425f, 430f and 440f, as the userID and password are being requested and set to corporate server 110f for validation.

Figure 23:
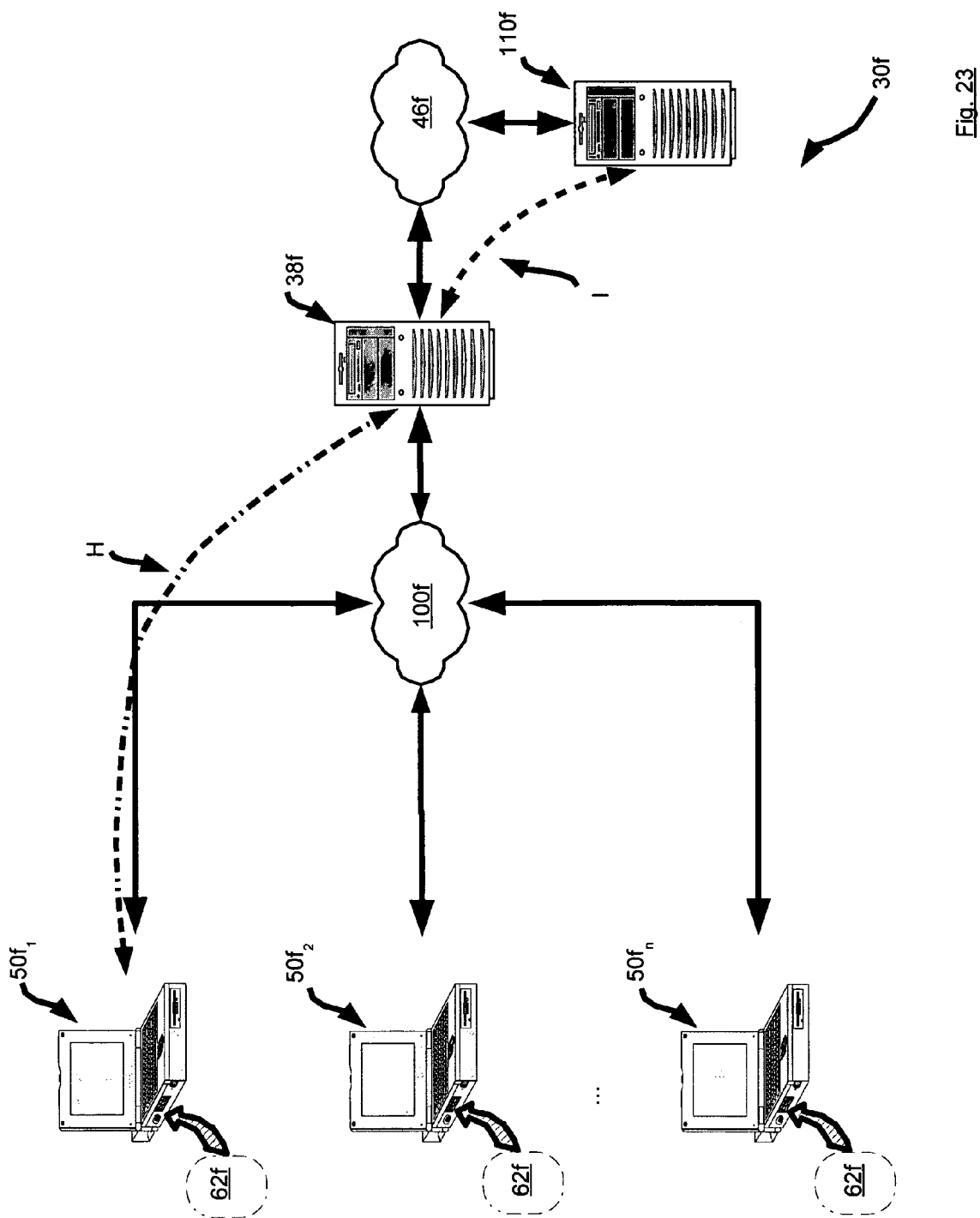
FIG. 23 shows the system of FIG. 19 during operation.

Referring now to FIG. 23, system 30f is shown wherein the pathway indicated at reference "H" represents the performance of steps 455f, to the extent that communications between server 38f and laptop $50f_1$ are being encrypted. By the same token, the pathway indicated at reference "I" the performance of steps 455f, to the extent that communications between server 110f and laptop 50$f_1$ are part of the regular transactions being conducted on server 110f by the user at laptop 50$f_1$. Put in other words, the pathway at reference "I" represents the fact that the user owning certificate 66f is logged into server 110f.

Figure 24:
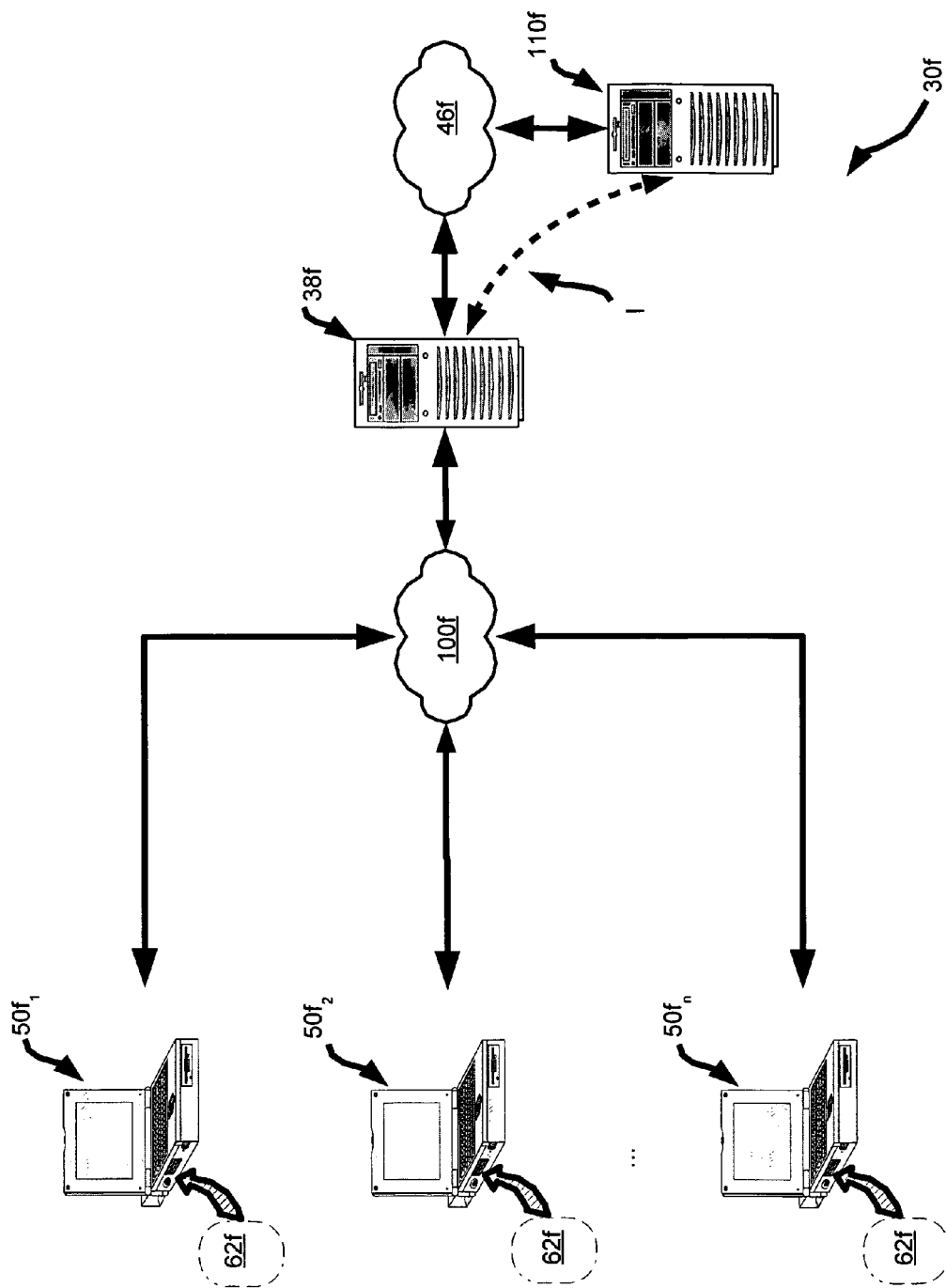
FIG. 24 shows the system of FIG. 19 during operation.
Figure 25:
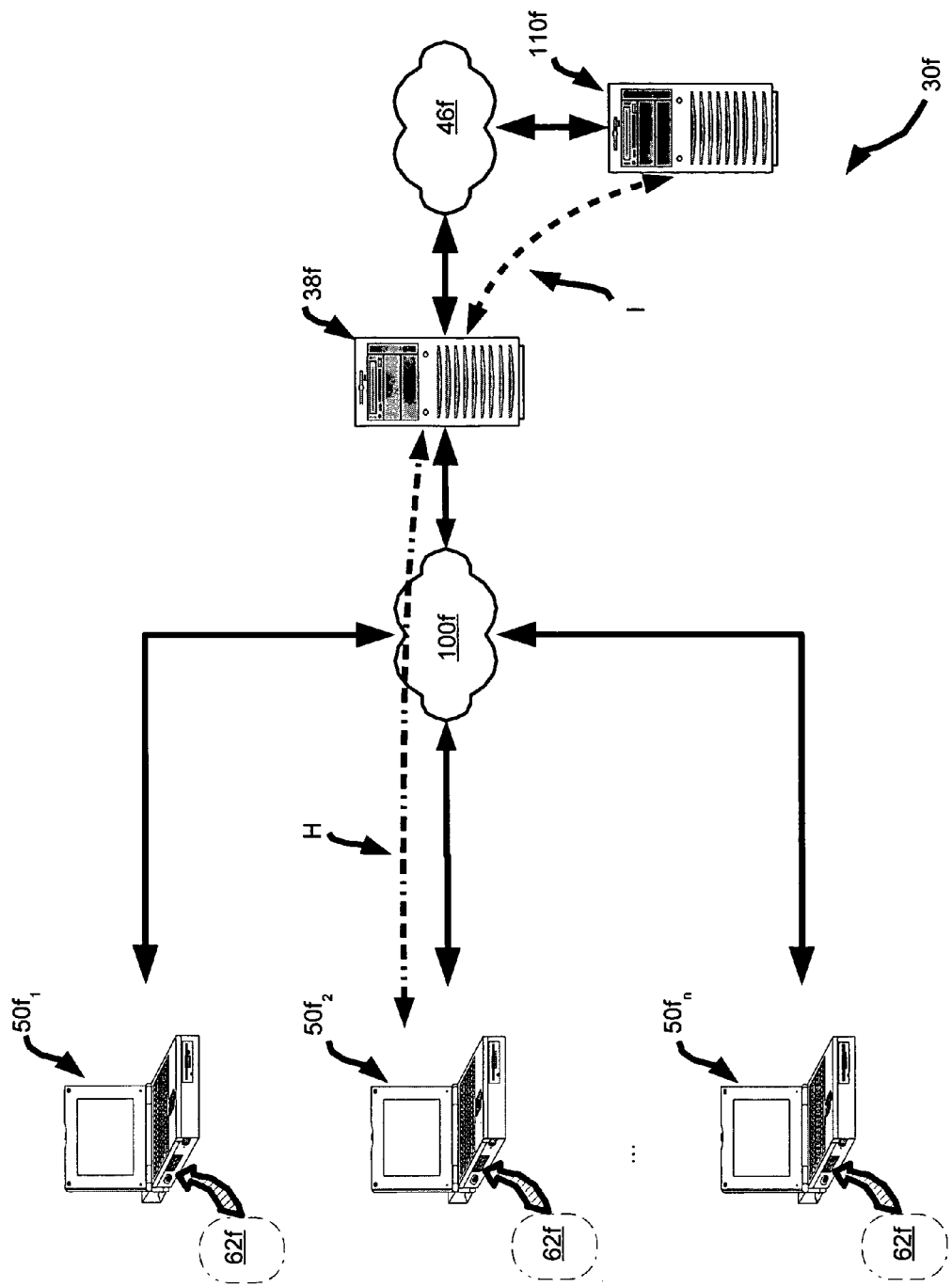
FIG. 25 shows the system of FIG. 19 during operation.

Accordingly, the user at laptop 50$f_1$ can logout of laptop 50$f_1$, but remain logged into server 110f. This is represented in FIG. 24, wherein pathway "I" remains in place, but pathway "H" is no longer present. The user can then move from laptop 50$f_1$ to laptop 50$f_2$ and continue the session with server 110f, as represented in FIG. 25 wherein pathway "H" is now shown between laptop 50$f_2$ and server 38f.

Figure 26:
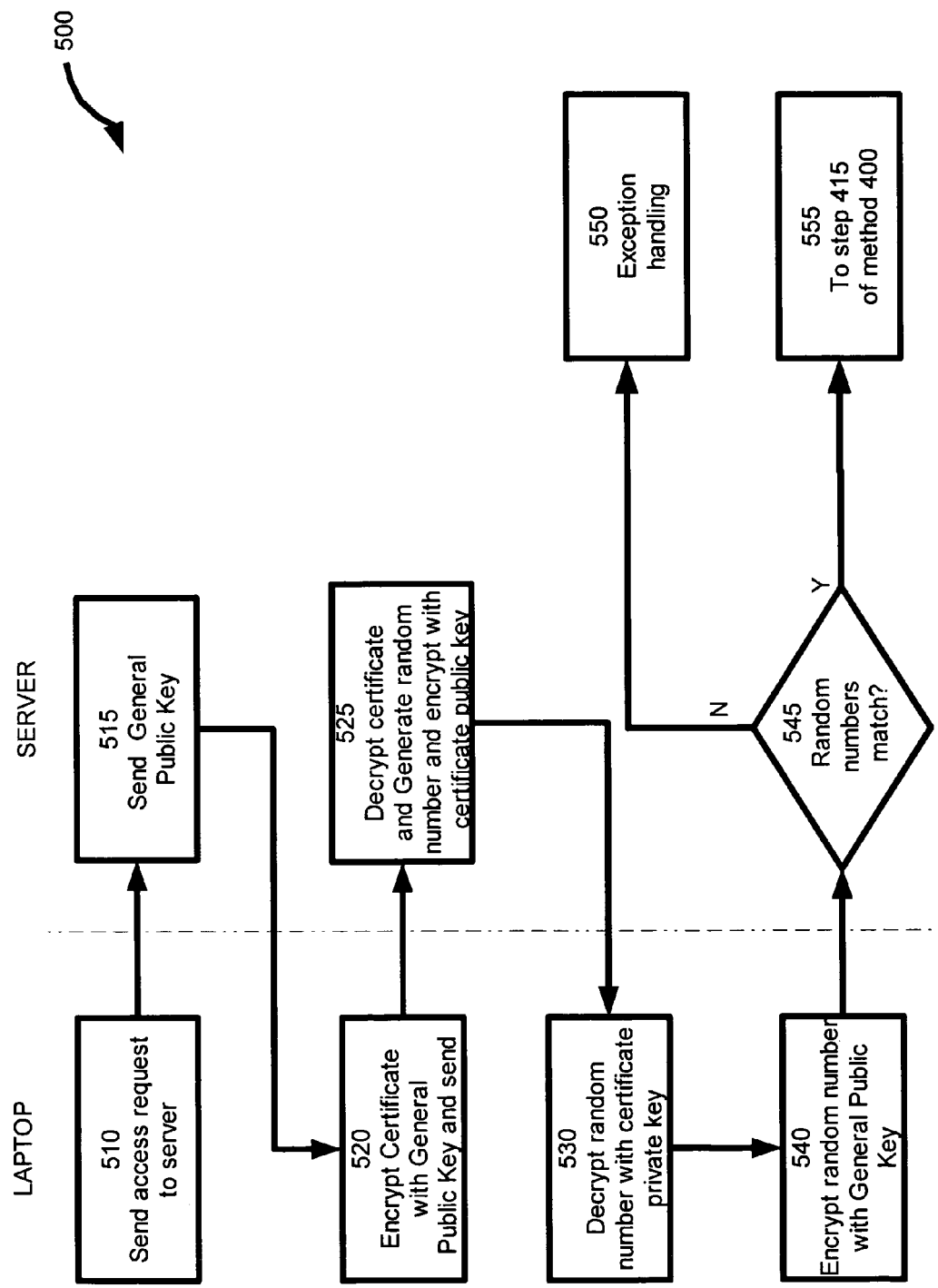
FIG. 26 shows a series of substeps that can be used to perform one of the steps in the method of FIG. 4; and, FIG. 27 shows a modified version of the personal integrated circuit of FIG. 2 in accordance with another embodiment of the invention.

Referring now to FIG. 26, a method for pre-authentication of a laptop with a server is indicated at 500. Method 500, suitably modified, can be used with any of systems 30, 30a, 30b, 30c, 30d, 30e or 30f, but as shown in FIG. 26 is contemplated for system 30. More particularly, method 500 shows a set of sub-steps that can be used to perform step 410 of method 400 on system 30. At step 510, an access request is sent to the server. Thus, referring back now to FIG. 1, laptop 50 will send a request to server 38 via link 54, tower 34 and link 42. At step 515, server 38 will respond to the access request by sending a General Public Key (not shown in the Figures) to laptop 50. The General Public Key will complement a General Private Key (not shown in the Figures) that is only known to server 38. Having received the General Public Key at laptop 50, at step 520 laptop 50 will use the General Public Key to encrypt digital certificate 66, and send that encrypted certificate 66 to server 38. Next at step 525, upon receiving certificate 66, server 38 will decrypt certificate 66 using the General Private Key stored in server 38. Having decrypted certificate 66, server 38 will then generate a random number "R" (not shown in the Figures) and encrypt random number "R" using certificate public key cPuK, and send that encrypted random number "R" back to laptop 50. Method 500 then advances to step 530, at which point laptop 50 decrypts the random number "R" using certificate private key cPrK. At step 540, laptop 50 then re-encrypts random number "R" with the General Public Key, and then sends the re-encrypted random number "R" back to server 38. At step 545, server 38 receives the re-encrypted random number "R", and decrypts it using the General Private Key. If the random number "R" originally sent at step 525 does not match the random number "R" received at step 545, then method 500 advances to step 550 for exception handling—which will usually involve terminating the communications with laptop 50 and setting a security flag that unauthorized access was attempted. However, if the random number "R" originally sent at step 525 does match the random number "R" received at step 545, then method 500 advances to step 555, moving the method back to step 415 of method 400, the digital certificate having been successfully sent (as per the function of step 410). Method 500 is also performed each time link 54 is broken and re-established as laptop 50 moves in and out of range of base station 34. However, each subsequent time method 500 is performed, it can be performed without having the user actually to re-login to server 38. It should now be understood that method 500 provides one way of providing security in the original delivery of certificate 66 to server 38, in a manner that helps reduce the risk of security breach due to eavesdropping. Variations on method 500, and other secure means of transmitting certificate 66 to server 38 will now occur to those of skill in the art.

It should also be understood that method 500 can be varied for use in system 30b, as a secure means of transmitting certificate 66b from WPDA 80b to laptop 50d. In this variation, WPDA 80b performs the function of laptop 50 (as described in the previous paragraph), while laptop 50b performs the function of server 38 (as described in the previous paragraph.) By the same token, in system 30b, once certificate 66b has been sent from WPDA 80b to laptop 50b, method 500 can be used to send certificate 66b from laptop 50b to server 38b. Method 500 is also performed each time the link between WPDA 80b and laptop 50b is broken and re-established as WPDA 80b moves in and out of range of laptop 50b. However, each subsequent time method 500 is performed, it can be performed without having the user actually to re-login to server 38b. This variation applies equally to system 30d.

Those of skill in the art will now appreciate that implementing method 500 in system 30b (and 30d) to authenticate the WPDA 80b with laptop 50b can be part of the solution in dealing with the "split tunnelling" problem that can be found in current versions of Windows 2000 and Windows XP from Microsoft. More particularly, the "split tunnelling" problem can occur when laptop 50b is running Windows 2000 or Windows XP, and acting as a bridge between WPDA 80b and server 38b. In this particular mode of operation, where laptop 50b has elected to "share" the hard drive on the laptop 50b, then all information on that hard rive will be open to security breach via the network interface cards present in laptop 50b that comprise the bridge between WPDA 80b and server 38b. Such a breach is particularly vulnerable via the network interface card in laptop 50b used to communicate with WPDA 80b. It is thus desired to use an agent, such as a piece of software that moderates traffic between those network interface cards, or a piece of hardware present on network interface card that connects to WPDA 80b. Such an agent will perform the varied version of method 500 to authenticate WPDA 80b each time it comes into range of laptop 50b, but it will also be sure to strictly route traffic received WPDA 80b to the network interface card responsible for link 54b, thereby preventing WPDA 80b from access other portions of laptop 50b (including the hard drive thereon) and thus enhance the security for laptop 50b.

Figure 27:
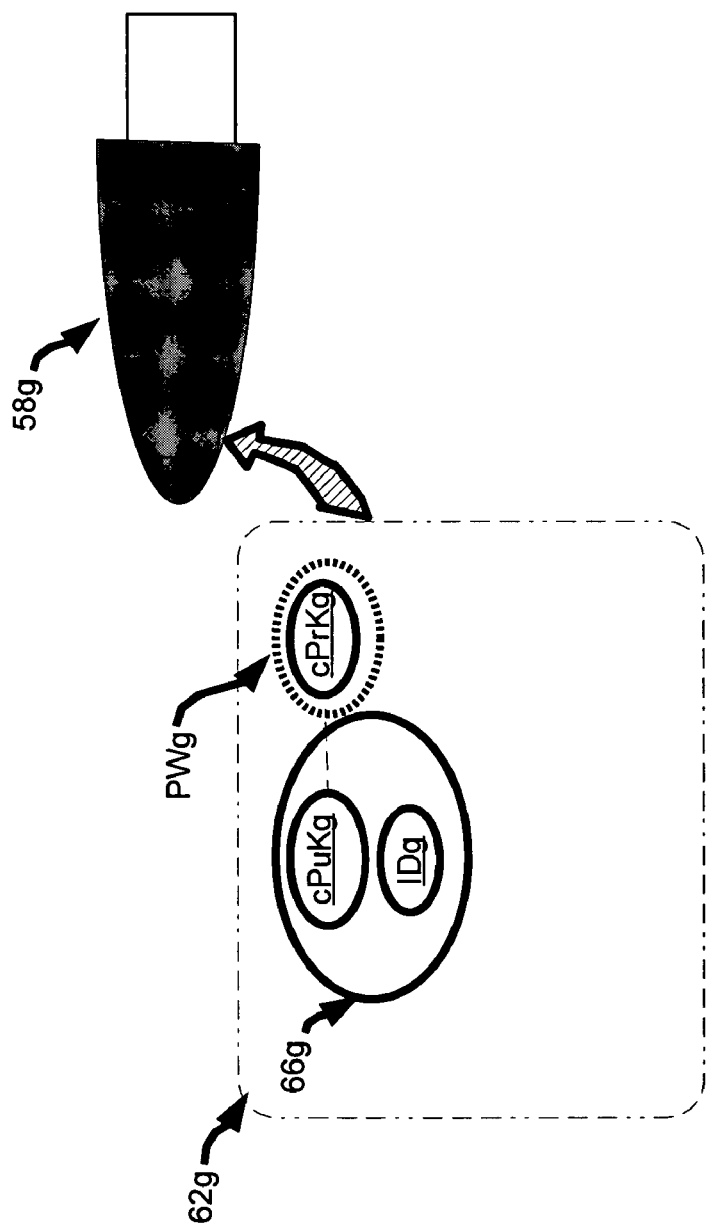

Referring now to FIG. 27, a modified PIC in accordance with another embodiment of the invention is indicated generally at 58g. PIC 58g performs substantially the same function as PIC 58 of FIG. 2, but includes certain variations. In particular, data files 62g include a digital certificate 66g which has been generated uniquely for the police officer that owns PIC 58g. Digital certificate 66g can be generated in any desired manner but is typically generated by a recognized Certificate Authority (CA). Digital certificate 66g will thus contain a public encryption key chug that is uniquely associated with that police officer and a variety of other identification information Dig for that police officer. Files 62g also contain a private encryption key cPrKg that corresponds to the public encryption key chug. In contrast, however, to files 62, private encryption key cPrKg is encrypted within files 62g, such encryption being denoted by the dotted ellipse indicated at PWg that encircles private encryption key cPrKg. Encryption PWg is effected using an encryption operation that is known to laptop 50. The encryption operation is reversed, to decrypt private encryption key cPrKg, by providing a correct password that is unique to the encryption PWg used to originally encrypt private encryption key cPrKg. Thus, when datafiles 62g are installed on laptop 50, laptop 50 will ask the user to enter a password. A correctly entered password will provide laptop 50 with the appropriate information to apply the reverse encryption operation to decrypt private encryption key cPrKg. It should now be apparent that the password referred to in association with step 425 of method 400 could correspond with the password needed to decrypt private encryption key cPrKg.

Also of note, in the present embodiment file 62g does not contain install file IF as previously discussed in relation to file 62 of FIG. 2. In this variation, the install file IF can be downloaded from a network onto laptop 50 and run once for the first installation of digital certificate 66g. It should now be apparent that the modified PIC 58g can be used with other embodiments of the invention, such as those discussed herein, by modifying those embodiments to cooperate with PIC 58g as discussed herein.

While only specific combinations of the various features and components of the present invention have been discussed herein, it will be apparent to those of skill in the art that desired subsets of the disclosed features and components and/or alternative combinations of these features and components can be utilized, as desired. For example, system 30, 30a, 30b, 30c, 30d, 30e and 30f and the methods described in association therewith can be combined, and or features from each incorporated into the other.

As another example, while laptop 50 is able to communicate with Internet 46 via the intermediate components shown in system 30, it should be understood that in other embodiments other intermediate components can be employed. Similarly laptop 50 can be any type of computing device to which it is desired to provide security features.

Additionally, while the embodiments herein show specific configurations of laptops and WPDAs that can be operated by a user accessing the server, it is to be understood that different configurations of user devices are contemplated. For example, a police cruiser (or other remote location) may be equipped with a wireless access point that bridges 802.11 communications with the 1XRTT communications. Such a wireless access point could then allow multiple laptops, WPDAs and other computing devices to access the central server connected to the 1XRTT network.

By the same token, while the various embodiments herein have been discussed in relation to police services, it is to be understood that the teachings herein can be more broadly applied to other types of networks where security protocols are employed.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A system for providing secure access to a computing resource comprising:
   a first computing device accessible to a user after establishing local authentication of said user at said first computing device; and,
   an authentication server connectable to said first computing device via a connection after said local authentication, said authentication server operable to:
      generate encryption keys for allowing said user to access said computing resource from said first computing device after establishing remote authentication of said user;
      enable access to said computing resource by sending a subset of said encryption keys to said first computing device;
      after termination of said local authentication at said first computing device and said user establishes local authentication at a second computing device, re-enables access to said computing resource by sending the subset of said encryption keys to said second computing device without having to re-establish remote authentication of said user.

2. The system of claim 1, said connection being a first connection, wherein said user establishes said local authentication at said second computing device via a second connection that is different from said first connection.

3. The system of claim 2 wherein said second connection is carried through said first computing device.

4. The system of claim 1 wherein said server and said first and second computing devices are further operable to encrypt communications over said connection using said encryption keys while access is provided to said resource.

5. The system of claim 4, wherein said encryption keys remain valid for the duration that said server maintains said remote authentication.

6. The system of claim 1 wherein said resource is a virtual private network that connects to said server.

7. The system of claim 1 wherein said server terminates said remote authentication if said user fails to re-establish local authentication at either the first or the second computing device within a predefined period of time.

8. The system of claim 1 wherein said authentication server is operable to send the subset of said encryption keys after receipt and validation of cryptographic data respective to said user that is loadable onto said first computing device.

9. The system of claim 1 wherein said remote authentication includes receipt of a userid and password respective to said user that is received by said first computing device and transmitted to said server.

10. An authentication server for connection with a first computing device that is accessible to a user after establishing local authentication of said user at said first computing device, said authentication server connectable to said first computing device via a connection after said local authentication and operable to generate encryption keys for allowing said user to access said computing resource from said first computing device after performing remote authentication of said user, said authentication server further operable to enable access to said computing resource by sending a subset of said encryption keys to said first computing device and, after termination of said local authentication at said first computing device and said user establishes local authentication at a second computing device, said server re-enables access to said computing resource by sending the subset of said encryption keys to said second computing device without having to re-perform remote authentication of said user.

11. The server of claim 10, said connection being a first connection, wherein said user establishes said local authentication at said second computing device via a second connection that is different from said first connection.

12. The server of claim 11 wherein said second connection is carried through said first computing device.

13. The server of claim 10 wherein said server and said first and second computing devices are further operable to encrypt communications using said subset of said encryption keys over said connection while access is provided to said resource.

14. The server of claim 13 wherein said encryption keys remain valid for the duration that said server maintains said remote authentication.

15. The server of claim 10 wherein said resource is a virtual private network that connects to said server.

16. The server of claim 10 wherein said server terminates said remote authentication if said user fails to re-establish local authentication at either the first or the second computing device within a predefined period of time.

17. The server of claim 10, further operable to send said subset of said keys after receipt and validation of a digital certificate respective to said user that is loadable onto said first computing device.

18. The server of claim 10 wherein said remote authentication includes receipt of a userid and password respective to said user that is received by said first computing device and transmitted to said server.

19. A method of providing secure access to a computing resource, comprising:
performing local authentication of a user at a first computing device;
performing remote authentication of said user at an authentication server connectable to said first computing device via a connection after said local authentication;
responsive to successful remote authentication, generating encryption keys for allowing said user to access the computing resource from the first computing device;
enabling access to said computing resource via said authentication server after said remote authentication by sending a subset of said encryption keys to the first computing device;
following termination of said local authentication at said first computing device and local authentication of said user at a second computing device, re-enabling access to said computing resource by sending said subset of said encryption keys to the second computing device without having to re-perform remote authentication of said user.

20. The method of claim 19, further comprising terminating said remote authentication if said user fails to re-establish local authentication at either the first or the second computing device within a predefined period of time.

21. The method of claim 19, said connection being a first connection, wherein said user establishes said local authentication at said second computing device via a second connection that is different from said first connection.

22. The method of claim 21, wherein said first and second computing devices are operable to encrypt communications over said first and second connections, respectively, while access is provided to said resource.

23. The method of claim 22, wherein said encrypted communications are conducted via said encryption keys.

24. The method of claim 22, wherein said resource is a virtual private network that connects to said server.

25. A method of providing secure access to a computing resource comprising:
following local authentication of a user at a first computing device, sending a digital certificate from said first computing device to a server;
performing remote user authentication at said server based on data received from said first computing device and determining if said remote user authentication is valid;
terminating said method if said remote user authentication is not valid;
generating security keys at said server and delivering a requisite portion of said security keys to said first computing device;
conducting communications between said server and said first computing device using said security keys; and
following termination of said local authentication at said first computing device and following local authentication of said user at a second computing device different from said first computing device:
delivering said requisite portion of said security keys to said second computing device; and
conducting communications between said server and said second computing device using said security keys.

26. The method of claim 19, further comprising:
detecting presence of a removable memory device at the first computing device, the removable memory device storing cryptographic data;
responsive to local authentication at the first computing device being successful, retrieving the cryptographic data from the removable memory device and sending the cryptographic data to the authentication server;
wherein remote authentication and transmittal of said subset of said encryption keys to the first computing device are performed after receipt of the cryptographic data from the first computing device.

27. The method of claim 26, further comprising:
terminating said local authentication at the first computing device responsive to detecting removal of the removable memory device from the first computing device.

28. The method of claim 27, further comprising:
detecting presence of the removable memory device at the second computing device;
responsive to local authentication at the second computing device being successful, retrieving the cryptographic data from the removable memory device and sending the cryptographic data to the authentication server;
wherein transmittal of said subset of said encryption keys is performed in response to receipt of the cryptographic data from the second computing device.

29. The method of claim 27, further comprising said first computing device rendering said cryptographic data inaccessible upon termination of said local authentication at the first computing device.

30. The method of claim 26, wherein said cryptographic data comprises a digital certificate.

31. The method of claim 26, wherein the first computing device and the second computing device are different.

32. The method of claim 26, wherein the first computing device and the second computing device are the same.

33. The system of claim 8, wherein said first computing device is operable to render said digital certificate inaccessible upon termination of said local authentication at the first computing device.

34. The system of claim 8, wherein said cryptographic data includes a digital certificate.

* * * * *